(12) United States Patent
    Peterson et al.

(10) Patent No.: US 10,861,214 B2
(45) Date of Patent: *Dec. 8, 2020

(54) GRAPHICS PROCESSOR WITH NON-BLOCKING CONCURRENT ARCHITECTURE

(71) Applicant: Imagination Technologies Limited, Kings Langley (GB)

(72) Inventors: Luke T. Peterson, San Francisco, CA (US); James A. McCombe, San Francisco, CA (US); Steven J. Clohset, San Francisco, CA (US); Jason R. Redgrave, Mountain View, CA (US)

(73) Assignee: Imagination Technologies Limited, Kings Langley (GB)

( * ) Notice: Subject to any disclaimer, the term of this patent is extended or adjusted under 35 U.S.C. 154(b) by 92 days.

This patent is subject to a terminal disclaimer.

(21) Appl. No.: 15/219,860

(22) Filed: Jul. 26, 2016

(65) Prior Publication Data

US 2016/0335791 A1  Nov. 17, 2016

Related U.S. Application Data

(63) Continuation of application No. 14/817,747, filed on Aug. 4, 2015, now Pat. No. 9,430,811, which is a
(Continued)

(51) Int. Cl.
    *G06T 15/00* (2011.01)
    *G06F 9/52* (2006.01)
    (Continued)

(52) U.S. Cl.
    CPC ............ *G06T 15/005* (2013.01); *G06F 9/505* (2013.01); *G06F 9/5033* (2013.01); *G06F 9/52* (2013.01);
    (Continued)

(58) Field of Classification Search
    CPC .......... G06T 1/20; G06T 1/60; G06T 15/005; G06T 15/06; G06T 2200/28;
    (Continued)

(56) References Cited

U.S. PATENT DOCUMENTS

| | | | | |
|---|---|---|---|---|
| 5,913,059 A * | 6/1999 | Torii | ..................... | G06F 9/3009 |
| | | | | 712/E9.032 |
| 6,532,520 B1 * | 3/2003 | Dean | ..................... | G06F 12/121 |
| | | | | 711/123 |

(Continued)

OTHER PUBLICATIONS

German Examination Report dated Jan. 16, 2020, in corresponding German Application No. 11 2012 002 465.6 (English translation).
(Continued)

*Primary Examiner* — Jacinta M Crawford
(74) *Attorney, Agent, or Firm* — Potomac Law Group, PLLC; Vincent M DeLuca

(57) ABSTRACT

In some aspects, systems and methods provide for forming groupings of a plurality of independently-specified computation workloads, such as graphics processing workloads, and in a specific example, ray tracing workloads. The workloads include a scheduling key, which is one basis on which the groupings can be formed. Workloads grouped together can all execute from the same source of instructions, on one or more different private data elements. Such workloads can recursively instantiate other workloads that reference the same private data elements. In some examples, the scheduling key can be used to identify a data element to be used by all the workloads of a grouping. Memory conflicts to private data elements are handled through scheduling of non-conflicted workloads or specific instructions and/or deferring conflicted workloads instead of locking memory locations.

20 Claims, 12 Drawing Sheets

Related U.S. Application Data continuation of application No. 14/230,093, filed on Mar. 31, 2014, now Pat. No. 9,098,918, which is a continuation of application No. 13/567,091, filed on Aug. 6, 2012, now Pat. No. 8,692,834, which is a continuation of application No. PCT/US2012/042591, filed on Jun. 15, 2012.

(60) Provisional application No. 61/497,915, filed on Jun. 16, 2011.

(51) Int. Cl.
| | | |
|---|---|---|
| *G06F 9/50* | (2006.01) | |
| *G06F 15/80* | (2006.01) | |
| *G06T 1/20* | (2006.01) | |
| *G06T 1/60* | (2006.01) | |
| *G06T 15/06* | (2011.01) | |

(52) U.S. Cl.
CPC ............ *G06F 15/8007* (2013.01); *G06T 1/20* (2013.01); *G06T 1/60* (2013.01); *G06T 15/06* (2013.01); *G06T 2200/28* (2013.01)

(58) Field of Classification Search
CPC ............ G06F 12/0875; G06F 15/8007; G06F 9/5033; G06F 9/505; G06F 9/52
USPC ................ 345/501, 505, 530, 543, 544, 557
See application file for complete search history.

(56) References Cited

U.S. PATENT DOCUMENTS

| | | | | |
|---|---|---|---|---|
| 6,820,261 B1* | 11/2004 | Bloch | ................... | G06F 9/4843 717/114 |
| 7,015,913 B1* | 3/2006 | Lindholm | ............. | G06F 9/3851 345/501 |
| 7,103,720 B1* | 9/2006 | Moy | ................... | G06F 12/0811 345/557 |
| 7,447,873 B1* | 11/2008 | Nordquist | ........... | G06F 9/30043 712/2 |
| 7,594,095 B1* | 9/2009 | Nordquist | ............. | G06F 9/4843 712/22 |
| 7,602,395 B1 | 10/2009 | Diard | | |
| 7,925,860 B1 | 4/2011 | Juffa et al. | | |
| 8,200,594 B1 | 6/2012 | Bleiweiss | | |
| 8,345,053 B2* | 1/2013 | Jiao | ........................ | G06T 15/005 345/501 |
| 8,390,631 B2 | 3/2013 | McMullen et al. | | |
| 8,627,331 B1* | 1/2014 | Grunwald | ........... | H04L 67/1087 718/106 |
| 2004/0263519 A1* | 12/2004 | Andrews | ............. | G06F 15/7846 345/502 |
| 2005/0120194 A1* | 6/2005 | Kissell | ................... | G06F 8/4442 712/242 |
| 2005/0240930 A1* | 10/2005 | Amamiya | ............. | G06F 9/3012 718/100 |
| 2006/0143608 A1* | 6/2006 | Dostert | ................. | G06F 9/5027 718/1 |
| 2006/0230207 A1* | 10/2006 | Finkler | ................. | G06F 9/5016 710/240 |
| 2007/0030278 A1 | 2/2007 | Prokopenko et al. | | |
| 2007/0273698 A1* | 11/2007 | Du | ....................... | G06F 9/30167 345/501 |
| 2008/0005547 A1 | 1/2008 | Papakipos et al. | | |
| 2008/0074433 A1 | 3/2008 | Jiao et al. | | |
| 2008/0077926 A1* | 3/2008 | Jeter | ..................... | G06F 9/4881 718/102 |
| 2008/0143730 A1 | 6/2008 | Lindholm et al. | | |
| 2009/0083493 A1* | 3/2009 | Kinter | ................. | G06F 12/0811 711/141 |
| 2009/0322752 A1* | 12/2009 | Peterson | ................. | G06T 15/06 345/426 |
| 2011/0050713 A1* | 3/2011 | McCrary | ............... | G06F 9/3851 345/522 |
| 2011/0057935 A1* | 3/2011 | Fowler | ................. | G06F 9/5016 345/502 |
| 2011/0131377 A1* | 6/2011 | Gray | ..................... | G06F 12/084 711/122 |
| 2011/0141122 A1* | 6/2011 | Hakura | ..................... | G06T 1/00 345/505 |
| 2012/0151145 A1 | 6/2012 | Lyashevsky | | |

OTHER PUBLICATIONS

German Examination Report dated Nov. 18, 2014, in corresponding German Application No. 11 2012 002 465.6 (English translation).
Nvidia, "Nvidia CUDA C Programming Guide," Version 3.1.1, Jul. 21, 2010, <http://developer.download.nvidia.com/compute/cuda/3_1/toolkit/docs/NVIDIA_CUDA_C_ProgrammingGuide_3.1.pdf>.
Wikipedia, "Mutual exclusion," Jun. 11, 2011, 4 pages, <https://en.wikipedia.org/w/index.php?title=Mutual_exclusion&oldid=433776675>.

\* cited by examiner

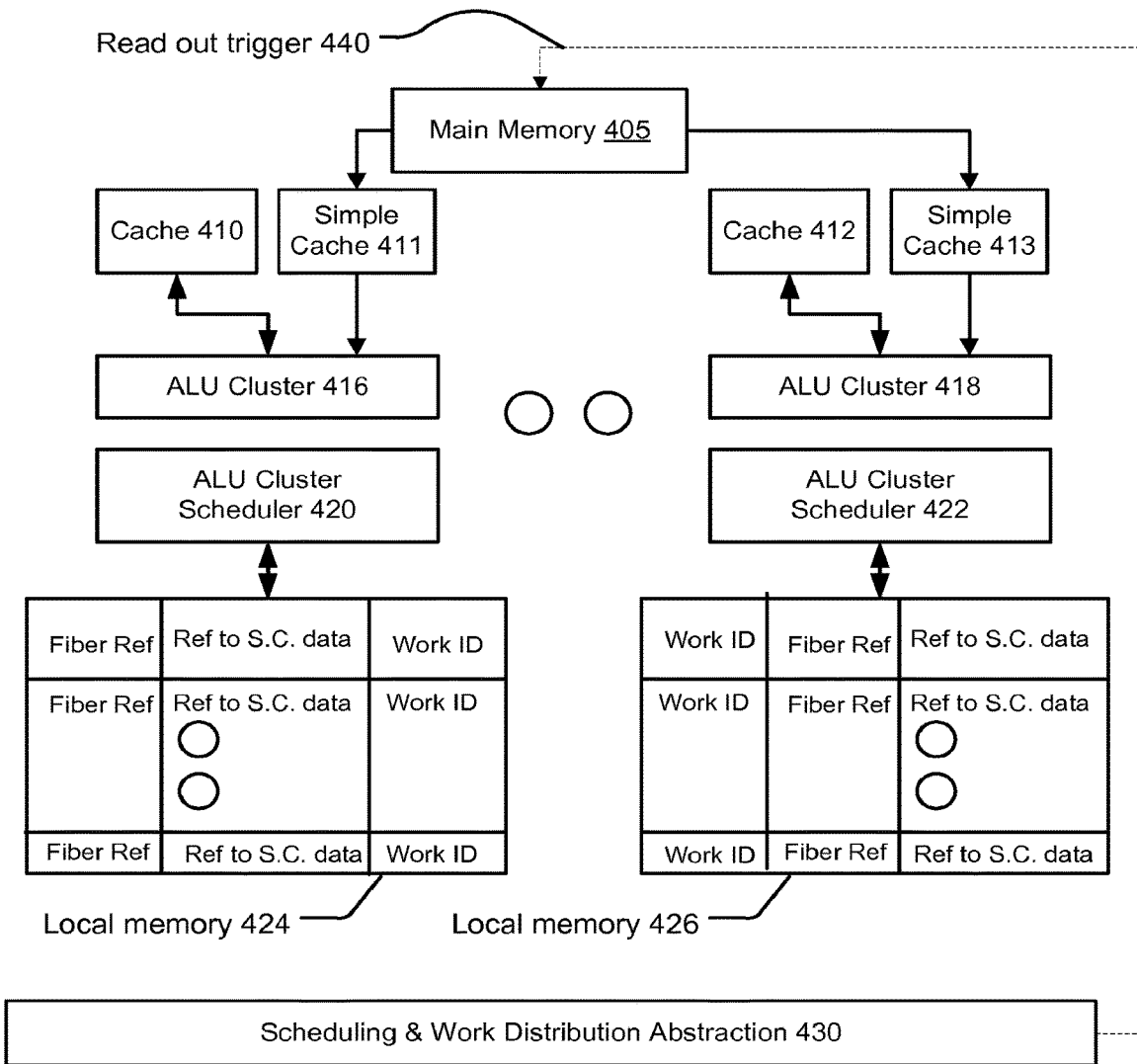
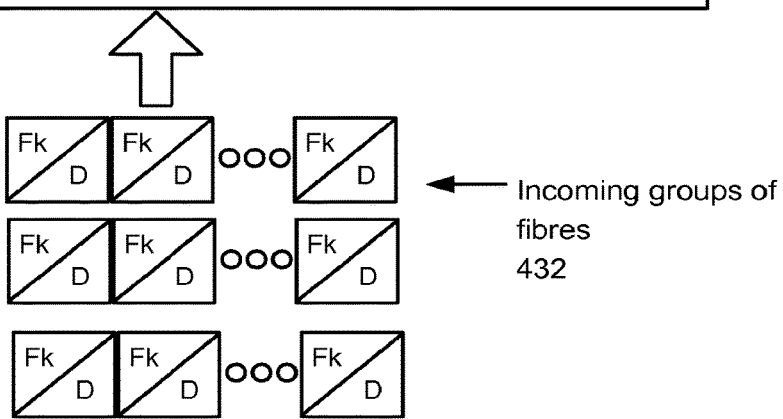
FIG. 6

GRAPHICS PROCESSOR WITH NON-BLOCKING CONCURRENT ARCHITECTURE

CROSS-REFERENCE TO RELATED APPLICATIONS

This application is a continuation of U.S. patent application Ser. No. 13/567,091, filed on Aug. 6, 2012, now U.S. Pat. No. 8,692,834, issued on Apr. 8, 2014, which is a continuation of PCT/2012/42591, filed on Jun. 15, 2012, entitled "Graphics Processor with Non-Blocking Concurrent Architecture", which claims priority from U.S. Provisional Patent App. No. 61/497,915, filed on Jun. 16, 2011, all such applications are hereby incorporated by reference in their entireties, for all purposes.

BACKGROUND

Field

The following relates generally to utilization of parallel processing resources, and in one more particular aspect, to programming interfaces and architectures that can be used in different classes of parallel computing problems, and in particular to graphics processing, including ray tracing.

Related Art

Computer architectures seek to increase parallelism at a hardware level and at a software/operating system level. A variety of techniques have been proposed to address parallelism for hardware and software. One general concept is to use multi-threading as a mechanism to increase parallelism.

Regarding software-based multithreading, an operating system can concurrently execute multiple processes (typically, multiple independent programs) on a single hardware execution resource by interleaving in time the execution of the processes. Such interleaving can be accomplished by an OS kernel, which determines what process has priority, and also can access the resources it needs to proceed with execution.

When a process has two or more semi-independent subtasks, multiple threading can increase throughput, give better response time, speed operations, improve program structure, use fewer system resources, and make more efficient use of multiprocessors. With multi-threading, a process has multiple threads of control. The concept of multithreaded computing is increasingly common, as faster clocks for processors becomes prohibitively power consumptive, and transistor budgets are used on wider architectures. As such, the term "thread" has come into increasing usage, but is not always used to refer to the same concept, but rather a context of usage can inform the meaning of the term.

A process can be viewed as an individual program or application that can be executed. As such, a process has a sequence of instructions to be executed. A thread also has a sequence of instructions for execution, but typically is more granular. For example, a function can represent a thread's sequence of instructions. If instantiated by a process, a thread shares that process' address space, yet can own unique resources within the process. Instructions from each thread can be individually scheduled, which allows threads of a process to be executed concurrently, as resource availability dictates.

Threads can be managed by a creating process and be invisible to a kernel of an operating system (also referred to as user-level or application-level threads). User threads are handled in user space, and controlled using a thread API provided in a library. Such control includes operations such as creation, termination, synchronization, scheduling. Creation, termination, and synchronization operations can be performed using user-space threads. Because user-space threads are not directly visible to the kernel (which is aware only of the overriding process containing the user-space threads), if a user-space thread blocks, its entire process blocks. When this happens, the benefit of threads parallelism is lost or reduced. Additional layers of complexity can be introduced to reduce blocking, but at a performance cost.

Kernel threads are handled in kernel space and created by the thread functions in the threads library. Kernel threads are kernel schedulable entities visible to the operating system. Kernel threads exist within the context of a process and provide the operating system the means to address and execute smaller segments of the process. Kernel threads also enable programs to take advantage of capabilities provided by the hardware for concurrent and parallel processing. With kernel threads, each user thread can have a corresponding kernel thread. Each thread is independently schedulable by the kernel, so if an instruction being executed from one thread blocks, instructions from other threads may be able to run. Creation, termination, and synchronization can be slower with kernel threads than user threads, since the kernel must be involved in thread management. Overhead may be greater, but more concurrency is possible using kernel threads, even with a uniprocessor system. As a result, total application performance with kernel-space threads can surpass user-space thread performance. However, developers must be more careful when creating large amounts of threads, as each thread adds more weight to the process and burdens the kernel.

Kernel threads can change the role of processes, in that a process is more of a logical container used to group related threads of an application in such an environment. Each process contains at least one thread. This single (initial) thread is created automatically by the system when the process starts up. An application must explicitly create the additional threads. An application with only one thread is a "single-threaded." An application with more than one thread is a "multi-threaded." An example treatment of a thread with respect to other threads is provided below.

A process's "state" information includes a program counter indexing a sequence of instructions to execute, and register state. The register context and program counter contain values that indicate the current state of program execution. The sequence of instructions to execute is the actual program code. For example, when a process context switch takes place, the newly scheduled process's register information tells the processor where the process left off in its execution. More specifically, a thread's program counter would contain the current instruction to be executed upon start up.

Like the context of a process, the context of a thread consists of instructions, attributes, user structure with register context, private storage, thread structure, and thread stack. Like a process, a thread has a kind of life cycle based on the execution of a set of control instructions. Through the course of time, threads, like processes, are created, run, sleep, and are terminated. New processes (and in a multi-threaded OS, at least one thread for the process) typically are created using a fork( ) call, which produces a process and thread ID. The process and its thread are linked to the active list. The new thread is flagged runnable, and thereafter it is placed in a run queue. The kernel schedules the thread to run, changing the thread state to an active running state. While in this state, the thread is given the resources it requests. This continues until a clock interrupt occurs, or the thread relinquishes its time to wait for a requested resource, or the thread is preempted by another (higher priority) thread. If this occurs, the thread's context is switched out.

A thread is switched out if it must wait for a requested resource (otherwise, the processor would block). This causes the thread to go into a sleep state. The thread sleeps until its requested resource returns and makes it eligible to run again. During the thread's sleep state, the kernel charges the currently running thread with CPU usage. After a period of time, the kernel can cause a context switch to another thread. The next thread to run will be the thread with the highest priority of the threads that are ready to run. For the remaining threads in that ready state, their priority can be adjusted upwards. Once a thread acquires the requested resource, it calls the wakeup routine and again changes state from sleep to run, making the thread eligible to run again. On the next context switch the thread is permitted to run, provided it is the next eligible candidate. When allowed to run, the thread state changes again to active running. Once the thread completes, it exits, releases all resources and can transfer to a zombie state. Once all resources are released, the thread and the process entries are released and the linked lists of active processes/threads can be updated.

Regarding more hardware-oriented parallelism, the capability of implementing parallel computing hardware is available in almost all computing devices, ranging from powerful mobile or desktop CPUs that may have 4, 8, 16, 32 or several dozen processing elements that are relatively complex to Graphics Processing Units (GPU) with many (e.g., hundreds) of relatively simple processors.

While GPU's where originally designed and still are primarily used to accelerate raster graphics, GPUs have gradually become more programmable. Such increased programmability has allowed for some multi-threaded computing problems to be expressed and executed on GPUs. Although GPU architectures have extremely high theoretical peak Floating Point Operations per Second (FLOPS), only rasterised graphics and certain well behaved, highly streamable compute problems can come close to realizing an actual throughput near to the theoretical throughput.

Increasing parallelism of computation typically involves a tradeoff between algorithmic complexity and overhead incurred in managing sharing of computation resources. Another important consideration is that algorithms execute correctly, such that data values are not corrupted. Parallel execution of threads, which may use shared data can cause data corruption by improper timing of reads and writes to shared data values. Negotiating access or serializing access to such shared data values incurs overhead.

Another concern largely is ensuring correctness of data during increasingly parallel execution. Principally, parallelism (and avoidance of data corruption) among different threads is handled through locks on variables that are at risk for being written (or read) out of correct order by conflicting processes in a system. The concept essentially is that when a given process wants to write to such a variable (e.g., a global variable), the process attempts to lock the variable. If no other process has a lock on the variable, then the lock can be granted to the requesting process. The process performs its write, and then releases the lock. As can be discerned, the usage of locks depends on a mechanism to detect or identify which variables should be protected by locks, and an arbiter to check lock status, grant lock status, and revoke lock status. Often, which variables need to be protected depends also on whether a given software procedure is intended to be available for usage on multithreaded platforms, in which a number of such instances of such procedure may be executing in concurrently executing processes.

Programmers can specify portions of code in a process to be protected by a lock. At compile time, a compiler can process such code, and in some cases also could detect variables that may be at risk, but which were not protected, and can insert such locks into the compiled object code.

One implementation of a lock is Mutual Exclusion (mutex), which controls how different portions of computer code can access a shared resource, such as a global variable. For example, a portion of code that needs to read a given variable should not be allowed to execute during an update of that variable by another process. The term mutex also is used in the sense of a program element that operates to negotiate a mutual exclusion of different program elements for conflicting variables. In a multi-threaded execution environment, a number of threads can be executing, and ultimately may need to access a given data object protected by a mutex. If the mutex currently is active, then typically the operating system will cause the threads that are waiting for that mutex to go to sleep (i.e., cease execution). Thus, as more and more threads reach the mutex, they each are made to go to sleep to await a time when the operating system indicates that they can continue execution. The operating system can wake these threads by a relative order in which they arrived at the mutex; the order in which they are awakened may simply be indeterminate.

Other approaches to allocation of shared resources includes semaphores, which allocate a set of undifferentiated resource elements among processes that desire to use the elements. A semaphore essentially counts how many elements of the resource are available for use from the set, adjusting the count as resources are reserved and released. When no elements of a given resource are available, then a process requesting use of the resource waits until an element of the resource has been released. Typically, semaphores are implemented in operating systems for resource allocation.

Variations on basic locking concepts exist, such as spinlocking, which allows threads to continue to actively ask when a given lock is free, such that their responsiveness is increased by not having to be awakened, which incurs overhead (context swapping). However, spinlocking does use processor cycles, and consequently inherently reduces efficiency. Other variations include recursive locking, implementing time limits on locks, such that a process will not wait indefinitely to acquire the lock for a particular object, but instead continue execution, if possible, if its lock request is not fulfilled in a given time period. Such an approach is useful in embedded systems, where absolute timing execution for critical processes may be necessary.

A further example variation is recursive locking, which is a strategy proposed for computing architectures that have Non-Uniform Access (NUMA) to a shared memory. Typically, groups of general purpose processors, each with an onchip cache, and operating in a system with a shared main memory will have NUMA properties (practically, a large majority of low-cost computation platforms). Recursive locking is based on the realization that a process resident on a processor that has a locked memory location (standard test and set locking) is more likely to be granted access to that locked memory location than a process executing on a different chip, due to differences in communication delay incurred by interconnect between the processors. Recursive locking seeks to enforce a predictable and controllable preference for granting a lock to a process that may have more data locality by granting locks to processes executing on the node that already has the lock by adding a condition to the lock granting process that tests an identifier for which node is hosting the thread requesting the lock.

SUMMARY

Aspects of an example system for performing concurrent graphics computation, include a cluster of computation elements, where each computation element comprises a local memory, and a plurality of Single Instruction Multiple Data (SIMD) Arithmetic Logic Units (ALUs). The system also has a scheduler for the cluster of computation elements. The scheduler is operable to receive inputs defining instances of a first type of computation to be performed on the cluster, where each of the instances is associated with a respective scheduling key. The scheduler is operable to sort the instances according to their scheduling keys into packets, and emit a packet comprising a plurality of instances of computation. The system has a distributor that is operable to receive the packet, and distribute the instances among the computation elements of the cluster. Each of the computation elements is operable to combine instances with different scheduling keys for concurrent execution, for which the same computation is to be performed and to concurrently execute the computation for the combined discrete portions of computation.

Exemplary further aspects can include that instances can be synchronized for memory accesses to memory locations that are open to reading and writing with other instances by identifying conflicting memory ranges among different instances, before instructions accessing those conflicting memory ranges have been dispatched for execution. The scheduler can perform such identifying of conflicting memory ranges using instance-specific memory addresses for a variable declaration. The system can disperse instance-specific memory ranges among the plurality of computation elements during a setup phase. Each computation element can be operable to schedule groupings of instances of the second type of computation according to criteria comprising (1) execution from a common source of instructions, and (2) enforcing a rule that no grouping of instances to be executed in parallel may include multiple instances that write the same memory location.

In a further exemplary aspect, a method to be performed in scheduling graphics computation on a computer system, provides for distributing workloads of a first type among a plurality of computation clusters. Each cluster is operable to schedule execution of instructions from first type workloads assigned to that cluster independently from other clusters of the plurality. Groupings of workloads of a second type are formed for execution in the plurality of computation clusters. The groupings are determined based on respective scheduling keys associated with workloads of the second type. Each scheduling key defines one or more of a data element to be used during execution of each grouping of workloads and a set of instructions to be executed for each workload of the second type. A grouping of workloads is selected and workloads of the grouping are distributed, among the plurality of computation clusters.

A further exemplary aspect includes a computation component for use in a computation system, comprising: a memory comprising a transitory portion and a persistent storage portion. The component further comprises a plurality of Arithmetic Logic Units (ALUs), each having read and write access to the memory and an input queue for receiving discrete definitions of computation to be performed on the plurality of ALUs. The definitions comprise a program reference, and a scheduling key. A local scheduler is operable to schedule the plurality of ALUs. The local scheduler is operable to prioritize scheduling of computation by identifying groupings of definitions of computation that have the same program reference and the same scheduling key. The scheduling key is used for identifying a location in the high turnover portion of the memory storing data to be used by the ALUs when executing the referenced program.

In a further aspect, a tangible computer readable medium having computer executable instructions stored comprises instructions for a thread of computation to be executed on a computation unit. The instructions for the thread comprise instructions to call a computation routine. The call of the computation routine comprises a definition of a scheduling key, a limited memory reference identifying a memory location for reading and writing, and a memory location to be read for that computation routine, and instructions that are to be executed after calling the computation routine, without waiting for return of information produced by the called computation routine during its execution. The computation routine further can be recursively instantiated, and each recursively instantiated instance automatically inherits the limited memory reference, and the read memory location is different. The read memory location can be updated based on a regular access pattern of a type of data being accessed.

BRIEF DESCRIPTION OF THE DRAWINGS

FIG. 6 depicts a stream of incoming groups of fibres, a scheduling/work distribution abstraction provides dispersal of the fibres in the groups;

DETAILED DESCRIPTION

Figure 1:
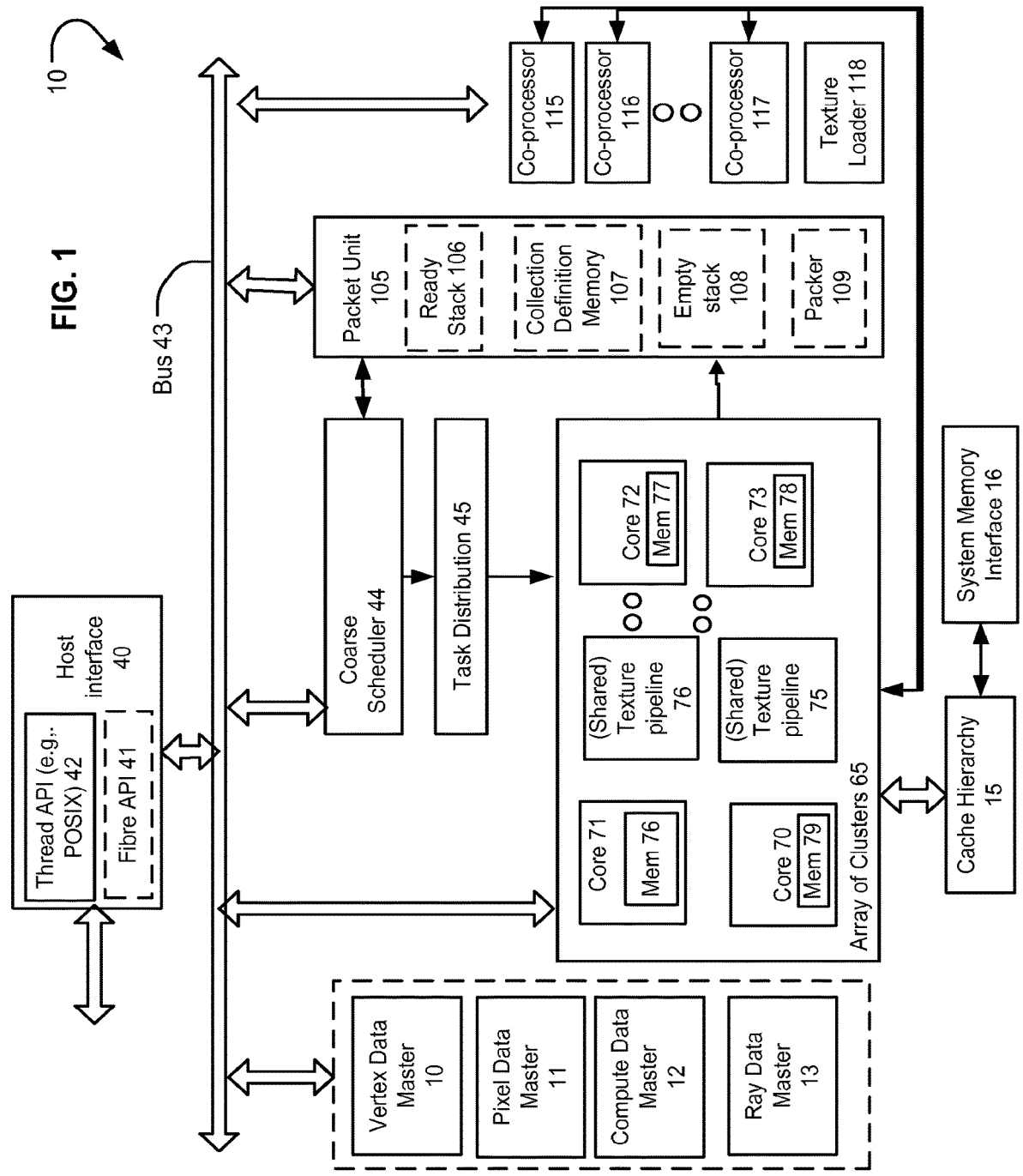
FIG. 1 depicts an architecture of an example system, in which concurrent and parallel processing and scheduling can be implemented according to these disclosures.

One reason that parallelism does not scale in accordance with computation resource availability is that memory bandwidth is not scaling in proportion to the available computation capability. Therefore, computational problems that do not enjoy inherent data locality can cause the computation elements to wait on data being accessed from memory. Memory access remains a problem even as peak theoretically available memory bandwidth has gone up, because such peak bandwidths assume burst transfer rates that often are unrealistic for these kinds of computation problems. Further, scalability of memory interface performance is hindered by other factors, such as pin count of the memory interface, and the fact that memory access latency does not readily scale with process technology changes. For example, DDR3 Column Address Strobe (CAS) latency can be around 9 ns, while typical DDR2 CAS latency is around 10 ns. Also, memory latency between processing nodes also may be a factor in different computational paradigms, such as NUMA architectures.

Further, the SIMD nature of the compute clusters means that simultaneously executing threads must follow identical program execution paths in order to realize peak computation throughput. For example, if half of the threads in such a SIMD cluster take a branch one way and the remainder the other branch, the hardware must serialize these two paths (i.e., one half stalls while the other half executes so that ultimately, the SIMD cluster can once again execute on vectorized data). In such a situation, the computation unit executes at only 50% throughput. In situations where a code base being executed contains many branches, a worst case performance from SIMD loss alone can be 1/SIMD_width, which is about 3% efficiency on a 32 wide SIMD architecture. There are a large number of computing problems, including ray tracing, spatial search, sorting and database traversal which, while theoretically parallizable, have not mapped efficiently to such wide SIMD architectures.

Some applications of the technology described below relates to graphics processors, such as processors that can perform rasterization and/or ray tracing. With particular regard to ray tracing, ray tracing can be used to produce realistic images rendered from 3-D scenes, in the context of video games, motion pictures, animated advertisement, industrial models, architectural simulation, and so on. One construct employed in the field of rendering is to provide a physical scene model, and associate surface information with different parts of the scene model. For example, a scene model can contain objects including a person, an automobile, and a building. The physical model of the scene would describe the surfaces of these objects, for example, as a wire frame model, which can include a large number of primitive shapes interconnected with each other to describe boundaries of the surfaces. This physical model generally lacks information about the visual appearance of the objects' surfaces. Then, information and programming is associated with particular surfaces, and/or portions of particular surfaces that describe their appearance. Such information can include textures for the surfaces, while programming associated with the surfaces often is intended to model what effect the surface has on light hitting the surface. For example, programming allows modeling of glass, a shiny surface, a bumpy surface and so on. Such programming and information thus is bound or otherwise associated with portions of the physical model descriptive of those surfaces. For example, programming can be associated with or bound to a particular primitive. Such programming and other description, or portions thereof, for a particular primitive or scene object can be referred to generally as a "shader" for that primitive or object.

The above description shows that the term "thread" can connote different meanings in different circumstances (but is not an exhaustive explanation of potential usages of the term). Therefore, in the description that follows, terminology will be used in an attempt to reduce reliance on terminology associated with multi-threading, e.g., by introducing the term "fibre" as a moniker that is intended to refer collectively and individually to a plurality of concepts, not all of which may need to be practiced in every implementation according to this disclosure. Nevertheless, multi-threaded operating systems, and machines that support concurrent and parallel processing of multi-threaded applications may be adapted to implement aspects of these disclosures, as will become more apparent from the description that follows.

In one aspect, a process in a multiprocessing environment, or a thread in a multi-threaded environment (or both, in a multiprocessing, multi-threaded environment) can use an API to create one or more units of work to be performed, each called a "fibre" herein, for sake of convenience.

In one aspect, a fibre is an instance of code, such as a routine, (e.g., a C function declaration) that can be forked repeatedly by a parent thread or recursively entered from another instance of the same fibre routine. An instance of a fibre routine (instances of fibre routines are, for convenience, simply called "fibres") includes an identifier for an element of data used as a scheduling key, and identification of a particular element (a declaration of) of fibre storage.

Fibres sharing a scheduling key can be grouped for concurrent execution (as described below, such grouping does not impose a requirement that such execution occur strictly in parallel). All fibres referencing the same element of fibre storage can be channeled for execution to a computation element having that element of fibre storage locally cached. In one exemplary implementation, a given element of fibre storage, for a given fibre, or set of fibres, has at least the characteristic that this element of fibre storage is readable and writable only by that fibre, or set of fibres; this limitation can be time-variant, or absolute. This limitation can be enforced by appropriate programming practices, by a compiler, by hardware, and by some combination thereof.

In one aspect, a fibre can be defined by a standard C function declaration and contains all the code required to execute the fibre to completion (standard inline expansions of functions can be provided). An operative difference being that a fibre is not to wait for a return value from another function called within the fibre. In the exemplary aspect, the fibre routine function declaration contains at least one argument for which a value is stored in fibre storage associated with the thread that forks fibres using that fibre routine declaration.

In one exemplary aspect, all fibres that reference a given element of fibre storage (e.g, instantiated by a parent thread (or fibre) have their execution controlled or distributed, so that they execute serially within a given processor (a processor can itself by a grouping of processing elements, and in one example, can include a plurality of SIMD processor elements), and concurrently or generally in parallel with other fibre routines that have the same (or matching) fibre key(s). In one example, a grouping of processor elements considered to be a processor, in this context, is determined according to which processing elements can write to a particular fibre storage location. In one example, all processor elements that can write to a particular fibre storage location are considered as a group to be a processor, for the purposes of enforcing serial execution of fibres that reference that particular fibre storage location. Such writing can be considered with respect to a subset of memories in a system, such as local memories, whereas accesses may not be so treated.

In one exemplary aspect, only fibres that ultimately trace to a common parent access a fibre storage element allocated for these fibres. Thus, a fibre that traces to a different parent for that set do not access such fibre storage location. Further, in exemplary aspects, no two or more fibres from the same parent are scheduled to be executed in parallel, so that no mutex or lock management is required to fibre storage locations.

However, in such exemplary aspect, a fibre otherwise can have full access to all the features that a standard thread would have, including full global memory access, local memory, barriers, texture samplers, private variables and all arithmetical and logical operations. The fibre routine may also contain arguments that are directly taken from the kernel arguments of its parent thread, which allows the fibre to have access to global memory pointers and other shared variables. These memory locations can be accessed using standard memory protection techniques.

Each thread in the system can define a plurality of fibres, each with a respective scheduling key. Further, a plurality of fibre routines can be defined, such that a given thread can define a number of fibres, which are instances of different fibre routines. As explained above, in an exemplary aspect, fibres of the same fibre routine (sharing a code base), and from the same parent (e.g., a parent thread or fibre), do not overlap in execution in implementations that avoid mutexes or locks for accessing at least one variable or data source that is available only to these fibres.

In some implementations, an API can be provided for instantiation/invocation of fibre routines (each fibre being an invocation of a fibre routine, as explained above) by a parent thread (or another fibre) through a semantic (an example of which is provided below). In some aspects, and unlike a function call in a typical multi-threaded environment, a kernel (or other system scheduler resource) does not necessarily immediately attempt to execute, or make preparations to execute, the fibre such invoked (as it would a thread, in a typical multi-threaded environment). Examples of such preparations were introduced above.

Instead, in one exemplary aspect, its activation (allocating actual processing resources for execution) is deferred until an unknown future time. Further, after a parent thread instantiates a fibre (e.g., by using a fibre definition API semantic), the parent thread can continue execution if otherwise permitted (e.g., continue to be an active thread, incrementing its program counter and using hardware resources). An API also can provide a semantic for instantiating a number of fibres (e.g., of the same fibre routine or of different fibre routines) at the same time. In one example, each of the fibres can have a common fibre key, and in another example, the fibres can have the same fibre key, but operate on one or more different values.

Because, in this exemplary aspect, a parent thread does not block or wait for a return value from this fibre, a fibre does not return any return value to a parent thread, as would a standard C function. By contrast, upon completion, a fibre routine can simply cease to exist (e.g., go into a zombie state, awaiting deallocation of memory resources), and does not return to the caller (parent) thread. Thus, for a fibre, in this aspect, to have effect or produce useful output, the fibre is to write results into fibre storage. Note that although the fibre has the capability to write results to a memory resource shared outside of the fibre (e.g., global or local memory), using a mutex or locking management, such an operation would be much slower than a write to fibre storage.

In an exemplary aspect, because fibres do not return a value, data that persists between fibres (e.g., fibres instantiated from a common thread) is confined by data resident or declared as resident in fibre storage. In practice, it is expected that the exemplary aspects disclosed herein would be practiced by allocating a fast available memory resource to fibre storage, and as such, would typically be expected to be a more limited resource. For example, as between a main memory and a cache memory, a comparatively larger portion of the cache would be dedicated to fibre storage than to other data that may be used by fibres.

Another aspect of some generality is that fibres that reference the same element of fibre storage are reference counted (e.g., a counter is incremented when a fibre referencing that element of fibre storage is emitted, and decremented when such a fibre completes). A reference count hitting zero thus indicates that there are no more fibres outstanding which reference a given fibre storage location (or locations in a case where a given set of fibre references a number of locations). Thus, such a reference count reaching zero can be a trigger to a parent thread that data in the fibre storage is available for usage and/or fetching. A flag set in response to the zero value, such as a flag provided by a built in function can be monitored by the parent thread, by way of further example.

The following is an example construct of coding semantics that can be used in an implementation according to these disclosures. This example is by way of explanation, and not limitation as to how a particular implementation may be structured, or the contents of such an implementation.

_fibre: This qualifier is used to declare a function as being a fibre routine. A fibre routine place this qualifier at the beginning of the function declaration.

_fibrestorage: This qualifier declares a variable as being present in fibre storage. Inside a parent thread, variables that are to be shared between child fibres are declared with this qualifier. Fibre routines do not declare fibre storage. Fibre routines contain at least on argument that has this qualifier.

_fibrekey: A fibre key is used to indicate one or more criteria used in scheduling the execution of the fibre. Examples of fibre keys include an offset in global memory, and a branch condition. A platform can schedule a fibre to run in parallel with other fibres based on fibre key matching. In one implementation, a fibre routine function declaration contains exactly one argument of this type.

+Fibreroutine(a,b): A fibre routine is invoked by making a standard function call but placing a +symbol ahead of the function name. Such invocation does not cause a jump execution to the fibre routine immediately, but rather defers its invocation to a future time. Execution of the calling routine can continue as normal, and the fibre routine does not return a value, as does a normal function call.

bool is_initial_thread_Iaunch( ): This is a built-in function which only returns true when called by the parent thread on its initial launch. This function is provided for convenience to differentiate between the parent thread routine being called by a typical thread launch, and notification that all child fibres from a parent thread are finished (can be determined by a reference count hitting zero).

The pseudocode in the Appendix exemplifies an approach to fibre computing, in which threads can instantiate fibres that behave according to this disclosure, and in which fibres can recursively instantiate other fibres that reference the same fibre data storage, but which have varying scheduling keys.

In view of the above introductory explanation and by way of further explanation, a variety of architectural examples and operational situations are explained below. Architectures in which fibre computing aspects can be practiced are diverse. One exemplary type of architecture is one where a plurality of computation clusters each comprise a plurality of Arithmetic Logic Units (ALUs), and a local controller that controls the ALUs. In a more particular instance of such architecture, all the ALUs of a cluster are run from a common program counter selected by the local controller. Each ALU, however, can have an independent port to a local memory. In some examples, the local memory can operate similar to a register set of a general purpose processor; each ALU can read and write to and from the local memory. In some implementations, the active program counter in each cluster can be changed on an instruction by instruction basis, without latency. In some architectures having such a plurality of clusters, full threads can be executed in each cluster, and state for such threads maintained in the local memories of the clusters. In some implementations, a local controller may treat fibres differently from threads, in terms of scheduling their execution in the ALUs controlled by that local controller. In some implementations, no fibre that references a common fibre memory storage location (i.e., the fibres share a common origin) would be scheduled for concurrent execution in the cluster in any implementation where memory arbitration is not implemented. One example architecture explicitly avoids arbitrating for local memory access by fibres, so that memory accesses can be accelerated.

Example workloads processed in computation architectures implementing disclosed aspects primarily relate to graphics rendering workloads, and more particularly, ray tracing is provided as a principal application example of fibre computing principals. However, a variety of computational problems can be addressed by application of disclosed aspects of fibre computing. In the context of implementing ray tracing functionality using aspects of fibre computing, a graphics chip may continue to implement rasterization based graphics processing with thread computing principals and using the same plurality of computation clusters. Vertex and pixel shading functions, which may apply to geometry and image processing for similarly can be implemented according to fibre computing or thread computing principles.

Fibre computing system architectures thus provide for acceptance of workloads specified from divergent sources, such as different threads or other fibres. Each workload can have a first and a second data element, where one of the data elements can be used as a scheduling key to control how that workloads is grouped with other workloads, and the other controls where, among a plurality of computation elements, that workload is executed.

Figure 2:
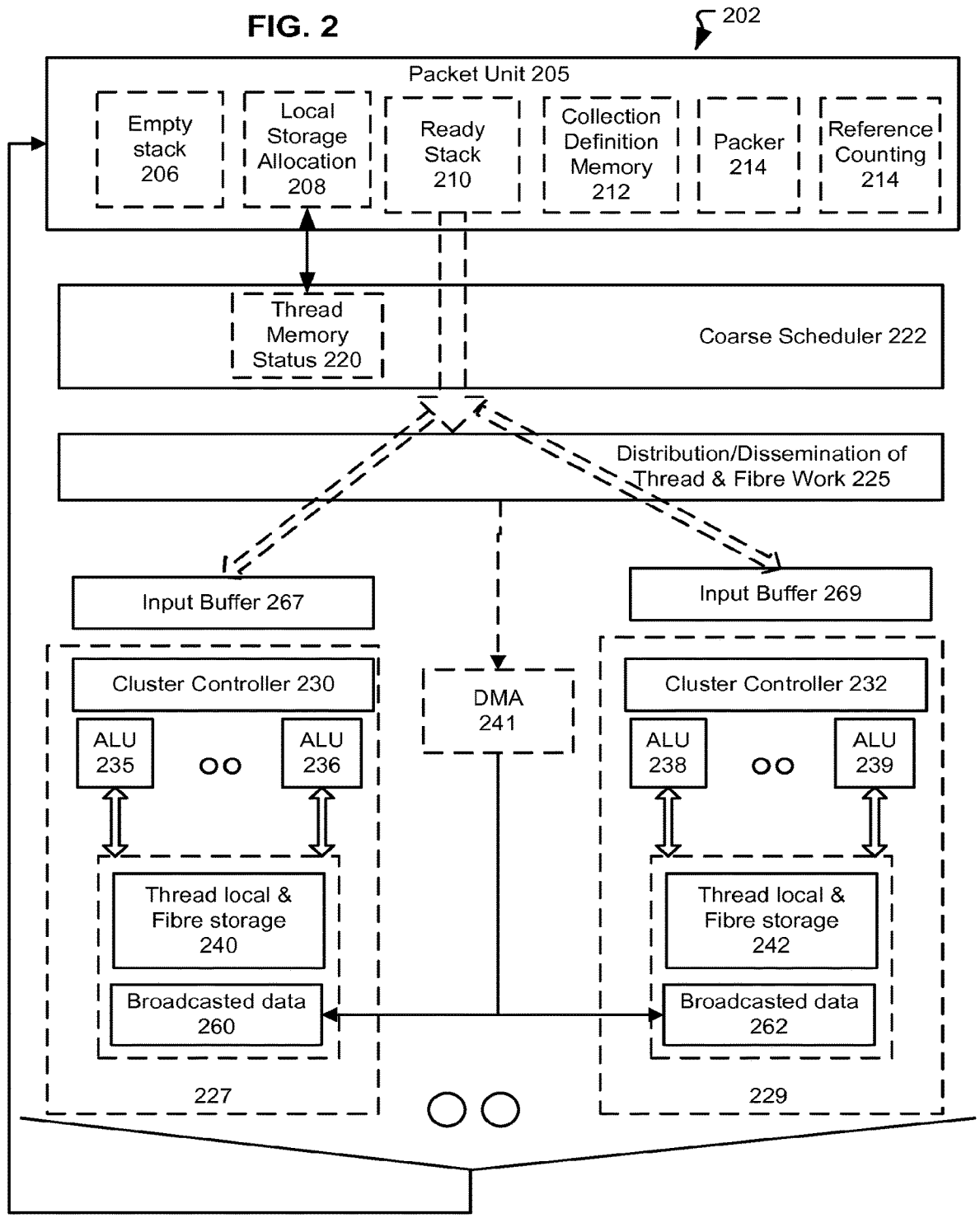
FIG. 2 depicts another exemplary system 202 in which disclosed aspects can be practiced.

Example system architectures in which disclosed aspects may be practiced are depicted in FIGS. 1 and 2. FIG. 1 depicts an architecture of an example system 10, in which concurrent and parallel processing and scheduling can be implemented according to these disclosures. Systems according to exemplary system 10 can be used to implement graphics processors, for example.

A host interface 40 may includes a thread API 42 and may include a fibre API 41. Thread API 42 can be used by routines miming on a host processor (not depicted), in order to instantiate new threads to be executed on system 10. Thread API 42 can be provided, for example, as a firmware coded API available in a System on Chip (SoC) with one or more generally programmable processor cores, such as a computation core operating according to an architecture specification and with an instruction set architecture. In other examples, thread API 42 can be provided with a driver for an add-on card that off-loads graphics processing loads from the host processor.

In one example, and as described below, fibre API 41 can be used by threads running on the host processor, to instantiate fibres that are executed in systems according to example system 10. As will be described below, threads executing in such systems also can access an API provided according to these disclosures, such that threads executing on the system also can define fibres for execution. In some examples, a fibre API is not exposed at the host interface level, but rather is made available only to threads executing within the graphics processor system 10.

Example system 10 includes a number of masters, which function to setup computation to be performed in system 10. In some examples, computation performed in system 10 is considerably more regular and voluminous than typical application code intended for execution on a processor. Rather, example workloads can include workloads to shade large set of vertices or pixels. Vertex data master 10 and pixel data master 11 can be provided to setup the usage of the available computation elements (described below) to perform such computation). By further example, compute data master 2 and ray data master 13 can be provided to setup computation for a large scale numerical analysis programs, and for ray tracing workloads.

Coarse scheduler 44 receives inputs from data masters, such as data masters 10-13, described above. Coarse scheduler can operate to allocate independently operable computation elements to perform the computation loads that can come from the data masters. Coarse scheduler receives status information from resources available in system 10. Such resources include status of memories located within an array of clusters 65 (described below). Such memories may be private to particular computation units (e.g., cores 70-73) within the array of clusters 65, such as memories 76-79. These memories 76-79 can be implemented as caches that can be allocated among threads that are executing on the core coupled with each memory (e.g., memory 76 can be allocated among threads executing on core 71). The allocation of such memory can be handled by coarse scheduler 44. Each data master (vertex, pixel, computer, ray) can communicate memory allocation requirements to coarse scheduler 44. Aspects of operation of coarse scheduler 44 and communication between a data master, for the purposes of thread scheduling and resource allocation, is described in U.S. Patent Pub. No. 2007/0101013 to Howson, which is incorporated by reference in its entirety herein. Such operation is exemplary, rather than exhaustive; such operation also may be adapted in view of the present disclosures.

The exemplary system 10 also includes a packet unit 105 that includes constituent components of a ready stack 106, a collection definition memory 107, an empty stack 108, and a packer unit 109. The functionality, usage, and operation of packet unit 105 within example architecture 10 will be described below. Example system 10 also may comprise a variety of co-processors adapted to perform specific functions, and are depicted as co-processors 115-117. Other special purpose functionality can be provided, such as texture loader 118.

FIG. 1 depicts that threads scheduled by coarse scheduler 44 can be distributed by a task distributor 45. In the depicted architecture of FIG. 1, the array of clusters, scheduler 44, and data masters 10-13 all can communicate using a bus 43. Of course, a bus 43 is one example approach to communication among the depicted structural and functional elements, and other approaches, such as a mesh interconnect, a multistage network, and so on can be provided.

Exemplary system 10 also may comprise a cache hierarchy 15 that includes one or more levels of cache memory, and a system memory interface 16 that can interface with a main memory, which can be implemented as one or more of high speed graphics RAM, DRAM, and the like. Approaches to large scale memory capacity may be adapted as new technologies are developed, and usage of well-known acronyms, such as DRAM, is not intended to confine the applicability of disclosed aspects to a given process or memory technology.

FIG. 2 depicts another exemplary system 202 in which disclosed aspects can be practiced. System 202 comprises a packet unit 205, which includes an empty stack, a local storage allocator 208, a ready stack 210, a collection definition memory 212, and a packet 214. Packet unit 205 can communicate with coarse scheduler 222, which can include a thread memory status module 220. Packet unit 205 collects groupings of fibres to be distributed among the plurality of compute clusters, which will perform work specified by the fibres, as described below. Coarse scheduler 222 tracks usage of computation resources in the plurality of computation clusters, such as memory allocation and usage. In some implementations, an allocation of a portion of a local memory in a particular computation cluster is static and assigned when setting up the thread on that computation cluster. Coarse scheduler 222 also can allocate fibres for execution in the clusters.

In one example, a thread executing on a particular cluster can instantiate a fibre routine (thereby making a fibre). Coarse scheduler 222 can receive the information concerning the instance and allocate a particular cluster to execute the fibre. As introduced above, allocation of a fibre to execute on a cluster does not indicate that execution would commence immediately, but rather execution of such fibre depends on An abstraction/distributor layer 225 separates a series of computation clusters (clusters 227 and 229 are depicted) from coarse scheduler 222 and from packet unit 205. Distributor layer 225 accepts groupings of fibres from packet unit 205 and causes the fibres to be distributed among the computation clusters, according to an exemplary approach described below. Layer 225 is an example means for distributing the groupings into regions of compute that will execute that computation.

Each cluster comprises a respective controller (controllers 230 and 232 depicted for cluster 227 and 229 respectively). Each cluster controller (e.g., 230 and 232) controls a plurality of arithmetic logic units (ALU) (e.g. cluster controller 230 controls a plurality of ALUs including ALU 235 and ALU 236). Each ALU of a cluster communicates with a thread local and fibre storage memory (e.g. thread local and fibre storage 240). In one implementation each ALU has a separate and dedicated access path to thread local and fibre storage, such that each ALU can read or write concurrently from and to the memory with the other ALUs of that cluster. Memory resources of a given cluster further comprise a broadcasted data memory (e.g. broadcasted data memory 260 of cluster 227). In an example implementation, broadcasted data memory 260 can be implemented in the same physical storage medium as thread local and fibre storage 240. An example implementation broadcasted data memory 260 can be highly interleaved cache that allows a particular location of memory map to a number of different locations in the broadcast data memory. In some implementations broadcasted data memory may comprise a ring buffer or FIFO memory implementation. These broadcasted data memories are fed by a direct memory access unit (DMA) 241. In one example implementation DMA 241 control storage of data in a plurality of broadcasted data memories in a number of clusters. A cluster is a means for performing concurrent computation on respective pluralities of data elements, using a respective single control flow.

Each cluster comprises an input buffer, e.g. cluster 227 comprises input buffer 267. Each input buffer for each cluster is written by distribution layer 225 and read by the respective controller of that cluster. For example distribution layer 225 writes to input buffer 267 which is read by cluster controller 230.

In view of the above introduction to the components of example system 202, aspects of the operation of this example system 202 are described below.

Figure 3:
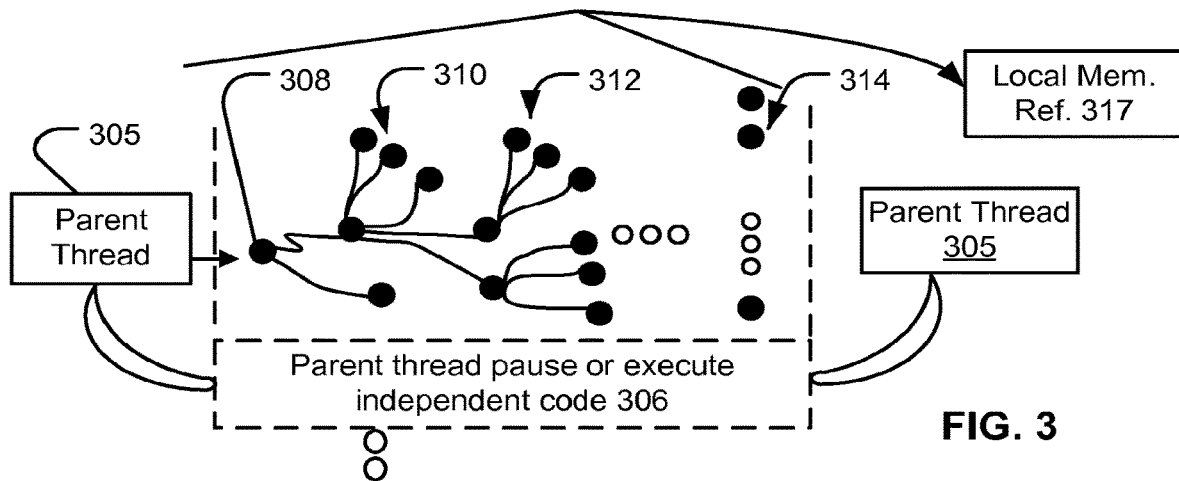
FIG. 3 depicts an aspect of heterogeneous computing where a parent thread can instantiate an instance of a second type of computation, and which can recursively instantiate further instances of the second type of computation.

FIG. 3 depicts an aspect of fibre computing whereas parent thread 305 can instantiate a first fibre 308; first fibre 308 can recursively instantiate a further group of fibres collectively identified as 310. Similarly those fibres each can instantiate further fibres collectively identified as 312 and so on through fibres 314. Each of the fibres depicted in FIG. 3 references a local memory location 317, and as will be described, includes at least one other data element that varies among the fibres and which can be used as a scheduling key in order to group fibres from different parent thread sources for distribution and execution among the compute clusters. During the time that the depicted fibres are executing on a cluster (or clusters) parent thread 305 may pause execution or may continue executing independent code. For example, after instantiating fibres 308, parent thread 305 may continue executing code even as fibres 308-314 concurrently execute on the same cluster.

Figure 4:
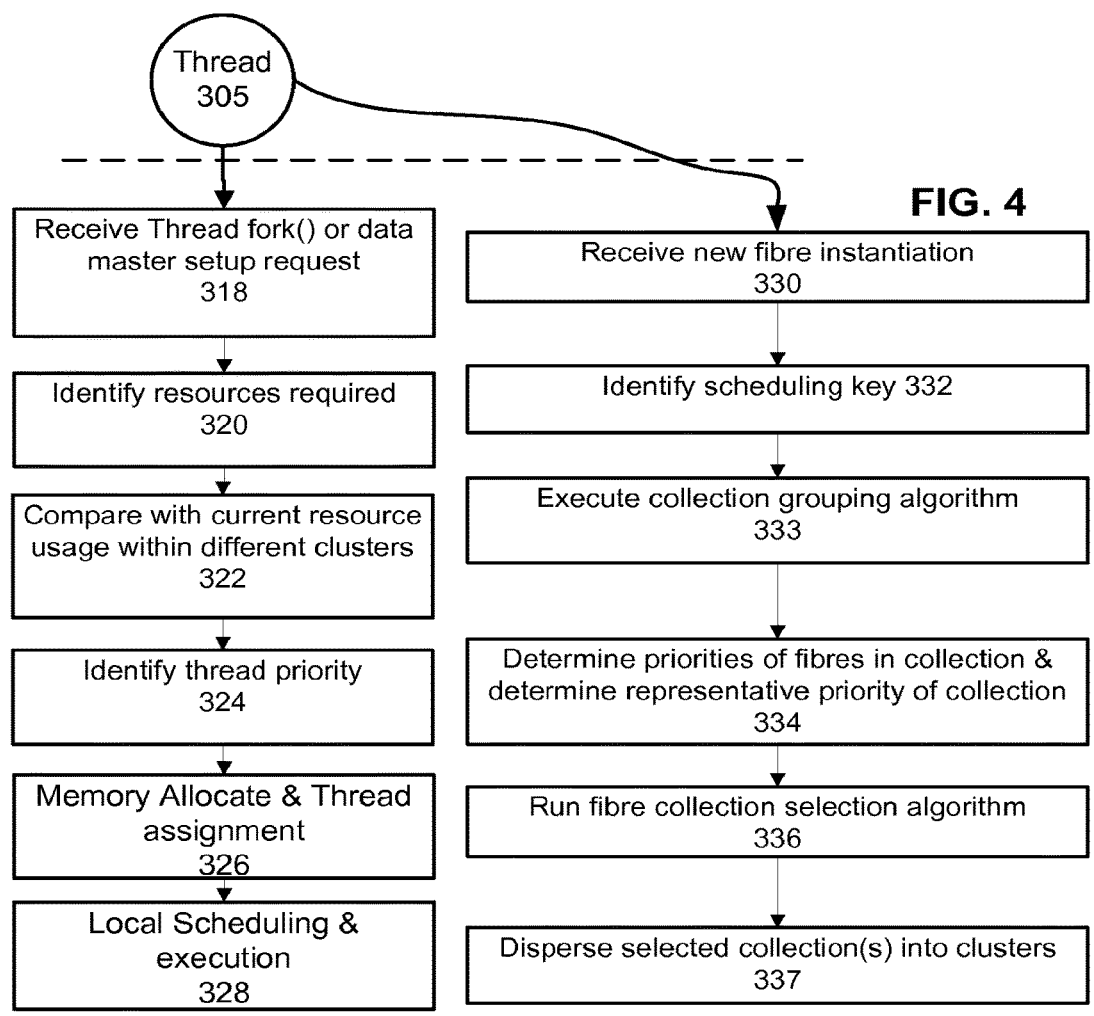
FIG. 4 depicts example steps in which a heterogeneous computation architecture can support concurrent execution of instances of multiple types of computation.

FIG. 4 depicts example steps in which a heterogeneous computation architecture can support concurrent threading and fibre execution. In FIG. 4, thread 305 may instantiate a new thread by forking 318 a new thread. Any of the data masters therein can also perform a setup request for a new thread to be executed on the array of clusters. Scheduler 272, upon receiving fork 318 can identify resources required to perform or otherwise execute the thread; the resources required to execute the thread can be compared with current resource usage among the different clusters in array of clusters 65 (in the example of FIG. 1). Additionally, at 324, a priority of the thread can be identified; higher priority threads can be given priority of execution. At 326, the thread that has been determined as ready to begin execution can have memory allocated and other resources assigned within a particular cluster where the thread will be executed. Subsequently, that cluster to which the thread is assigned can be responsible for scheduling (328) when instructions within that thread will be executed in order to execute the thread as a whole.

FIG. 4 also picks an example flow for setting up a fibre to be executed within the array of clusters 65. In particular, FIG. 4 depicts that a new fibre instance can be received 330. In one example, the fibre instance can include a scheduling key which, at 332, is identified. At 333, a collection grouping algorithm is executed. The collection grouping algorithm operates to collect fibres based on matching scheduling keys of respective fibres. Additionally each instantiated fibre can be associated with a respective priority. At 334, which priorities can be determined and used to form a representative priority of a collection of fibres. At 336, an algorithm to select collections of fibres to be executed on the array of clusters can be performed. Information identifying fibres of selected collections subsequently is dispersed among clusters in the array, as explained below. At 337, dispersal of the selected collection(s) of fibres among the clusters is performed.

Figure 5:
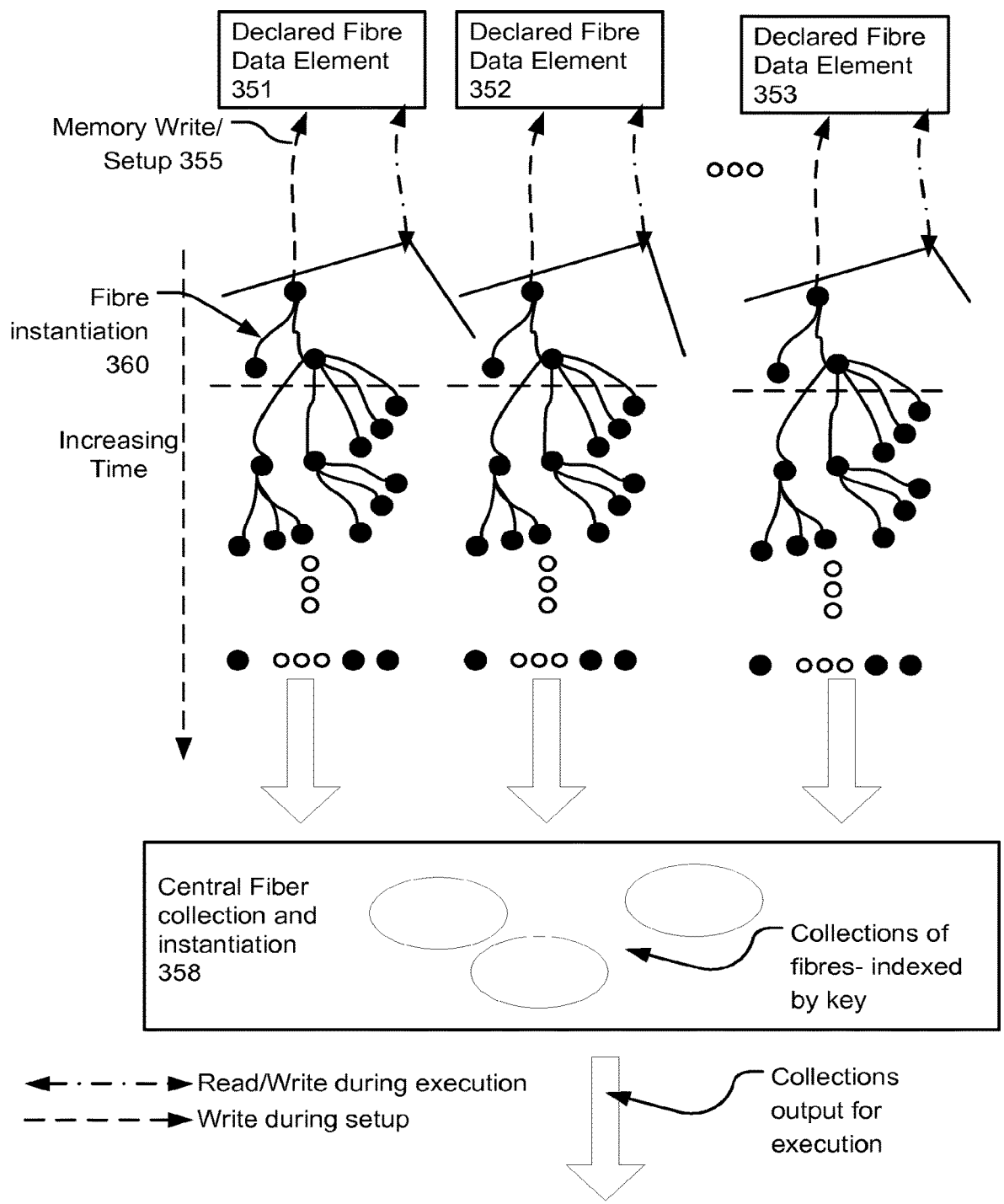
FIG. 5 depicts further aspects of fibre computing according to the disclosure.

FIG. 5 depicts further aspects of declaration of fibres, including declaration of fibre storage elements for respective instantiated fibres and further aspects of collecting fibres according to their scheduling keys. Aspects of FIG. 5 can be implemented within packet unit 205 (FIG. 2), for example.

In the example depicted in FIG. 5, a first instantiated fibre such as fibre instantiation 360 results in allocation of declared fibre data storage 351, which can be populated by a memory write 355. As computation time progresses more and more fibres may be recursively instantiated which all reference fibre data storage 351. However, each of these instantiated fibres typically would have a different scheduling key and therefore may be grouped with widely disparate fibres that reference different fibre data elements storage. Each time a further fibre is recursively instantiated, the reference count associated with those fibres is increased. Example usage and other manipulations of such reference count is described below.

These concepts are depicted in FIG. 5 with declared fibre data elements storage 352 and 353 which each are referenced by a different lineage of fibres. FIG. 5 further depicts that all the instantiated fibres can be managed by central fibre collection and instantiation 358 which forms collections of those fibres according to their scheduling keys. Fibre collection and instantiation 358 outputs collections for execution within the computational resources available. During such execution each fibre may reference its respective fibre data element, as depicted by the legend which indicates that read/write during execution may be repeated for all fibres that descend from an initial fibre instance that created a particular fibre data element.

FIG. 5 thus depicts several examples of fibre computing concepts. Many fibres send or are otherwise recursively instantiated from an initial fibre instance, which, as shown in FIGS. 3 and 4, can be created by a thread. By contrast with typical multithreading however each fibre instantiated is not necessarily scheduled for execution, or even attempted to be scheduled. Instead, instantiated fibres are collected according to a scheduling key. In the example of FIG. 5 scheduling can be accomplished by a centralized scheduling resource which ultimately distributes collections of fibres determined to be ready for execution among a plurality of independently operable computation clusters. Regardless of a number of threads that descend from a particular thread each thread ultimately can access the same element of fibre data. As will be described in one example each thread that references a particular fibre data element is made to execute serially on a single cluster of the array of clusters, or other available parallel computing resource. Further, because in many such examples each computation cluster can independently operate to switch among executing a plurality of threads and fibres, outputting a collection of fibres from the central fibre collection point does not intimately control when such fibres are executed but rather as explained below the fibres of the collection are stored in appropriate input buffer for a cluster in which those fibres ultimately will be executed.

FIG. 6 continues from the example of FIG. 5; FIG. 6 depicts a stream of incoming groups of fibres 432, a scheduling and work distribution abstraction 430 causes the fibres of groups to be dispersed among a plurality of clusters, two of which are depicted in FIG. 6. Dispersal, in the example of FIG. 6, comprises storing a reference to the fibre and other data that will be described below within a respective local memory for each cluster which is accessed by a scheduler for that cluster. In particular, an ALU cluster scheduler 420 reads from and maintains local memory 424, while ALU cluster scheduler 422 reads from and maintains local memory 426. Each ALU cluster scheduler 420 422 controls which stream of instructions is executed on its respective cluster 416 418. In the example of FIG. 6, each cluster 416-418 has read and write access to a respective cache 410 412. Additionally, each ALU cluster 416-418 also has read access to a respective simple cache 411 and 413. One operative distinction between cache 410 and 412 with respect to counterpart simple cache is 411-413 is that the simple cache is expected to be overwritten frequently with different data and temporal locality among data accesses expected to be comparatively low. By contrast, caches 410 and 412 are expected to maintain temporal locality to a higher degree. In the example of FIG. 6, a main memory hierarchy 405 feeds simple caches 411-412 responsive to direct memory access setup requests that can be generated by work distribution abstraction 430, for example. However, cache 410 and 412 typically would be setup to store fibre data elements, in addition to local thread storage. Therefore these caches would be primarily controlled for thread and fibre instantiation and not based upon instruction specific memory read access requirements, especially for fibre execution.

Figure 7:
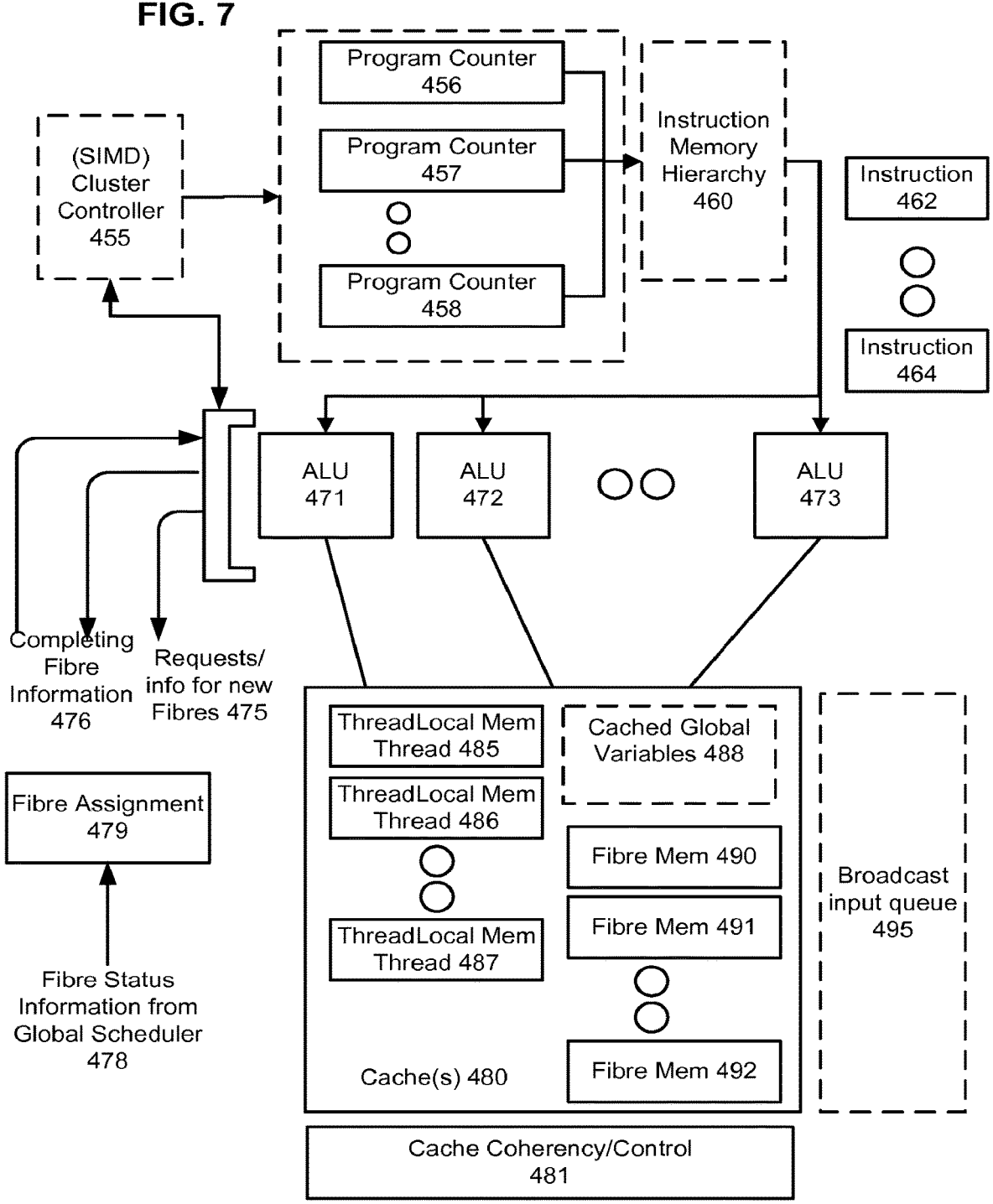
FIG. 7 depicts an example structure for a cluster that can be used in implementations of the array of clusters depicted in FIG. 1 or FIG. 2.

FIG. 7 depicts an example structure for a cluster that can be used in the array of clusters depicted in FIG. 1 or FIG. 2, for example. FIG. 7 depicts that a cluster controller 455 can maintain a plurality of program counters 456-458. Each program counter can be used to reference sequence of program instructions available from an instruction memory hierarchy 460. In some examples, instruction memory hierarchy can include an instruction cache where recently used instructions may be stored. Such instruction cache can implement a least recently used algorithm, for example, or a trace cache approach in which a sequence of instructions including branches is maintained within the cache. A trace cache approach may be more appropriate for a cluster in which the ALUs can perform speculative execution, e.g. where cluster controller can include a predictive mechanism for predicting whether branches will be taken or not.

Regardless of the specific implementation sequence of instructions, e.g. instruction 462 and instruction 464 can be provided from instruction memory hierarchy 460 to a plurality of ALUs 471-473. Thus, in the implementation depicted in FIG. 7 each ALU executes the same instruction; however, data provided for execution of that instruction may vary. Each ALU communicates fibre completion information 476 and can make requests or otherwise provide information for new fibres 475. Fibre assignment status can be maintained for the cluster by a fibre assignment module 479. In some examples, such module may be included in controller 455. Such module may receive status information from the global scheduler 478. For example, such fibre information can include information for new fibres to be executed within the cluster. Other information that can be maintained between global scheduler and the cluster includes fibre reference count information in some examples such fibre reference count information can be maintained within the cluster on which related fibres execute. In other words, one example implementation causes all related fibres to be executed on a single cluster, and in such implementation reference counts can be maintained within that cluster for those related fibres.

The example of FIG. 7 also shows that each ALU 471-473 maintains a port to cache 480. Cache 480 stores thread local data as exemplified by thread local memory 485-487; cache 480 also can store cache global variables 488. Cache 480 also includes a plurality of fibre memory locations 490-492. The example of FIG. 7 also comprises a broadcast input queue 495. In the example of FIG. 7, each ALU 471-473 can use cache 480 in a manner similar to a register set such that SIMD cluster controller 455 schedule instructions for different threads and different fibres on an instruction by instruction basis without incurring latency. Cache 480 can be managed or otherwise made coherent by a cache coherency/control 481. In some implementations, cache 480 can be allocated into different portions that are managed differently. In one example, cache 480 can be divided into a cache portion and a managed portion. The cache portion is populated according to the read/write transactions generated during the sequence of instructions being processed in ALUs 471-473. The cache portion seeks to maintain coherency with other parts of a memory hierarchy, and thus writes to the cache portion would generate coherency transactions. Also, to provide cache-like behavior for the cache portion, techniques such as tag memory, and coherency indications can be maintained for the cache portion.

The managed portion is allocated to specific store local data during computation, and does not have an expectation or goal of being coherent with another memory or memory hierarchy. The managed portion does not use tag memory or coherency indications, because the managed portion is setup with data in known locations, and the memory is not maintained for coherency. Therefore, properly initiated and executing code accessing the managed portion will be able to read and/or write the managed portion without limitations enforced for coherency. Fibre memory 490-492 is an example of such memory type. A global scheduler or work distribution can participate in setting up the managed portions of cluster-local memories. For example, scheduling abstraction 430 or local storage allocation 208 can perform this function. Coarse scheduler 222 can interoperate with local storage allocation 208 to coordinate allocation of caches used by threads and/or fibres, and the portion of such caches that will operate like caches. In some situations, the cache portion can be treated as a read only memory by fibres so that write back transactions are not generated in furtherance of coherency.

Figure 8:
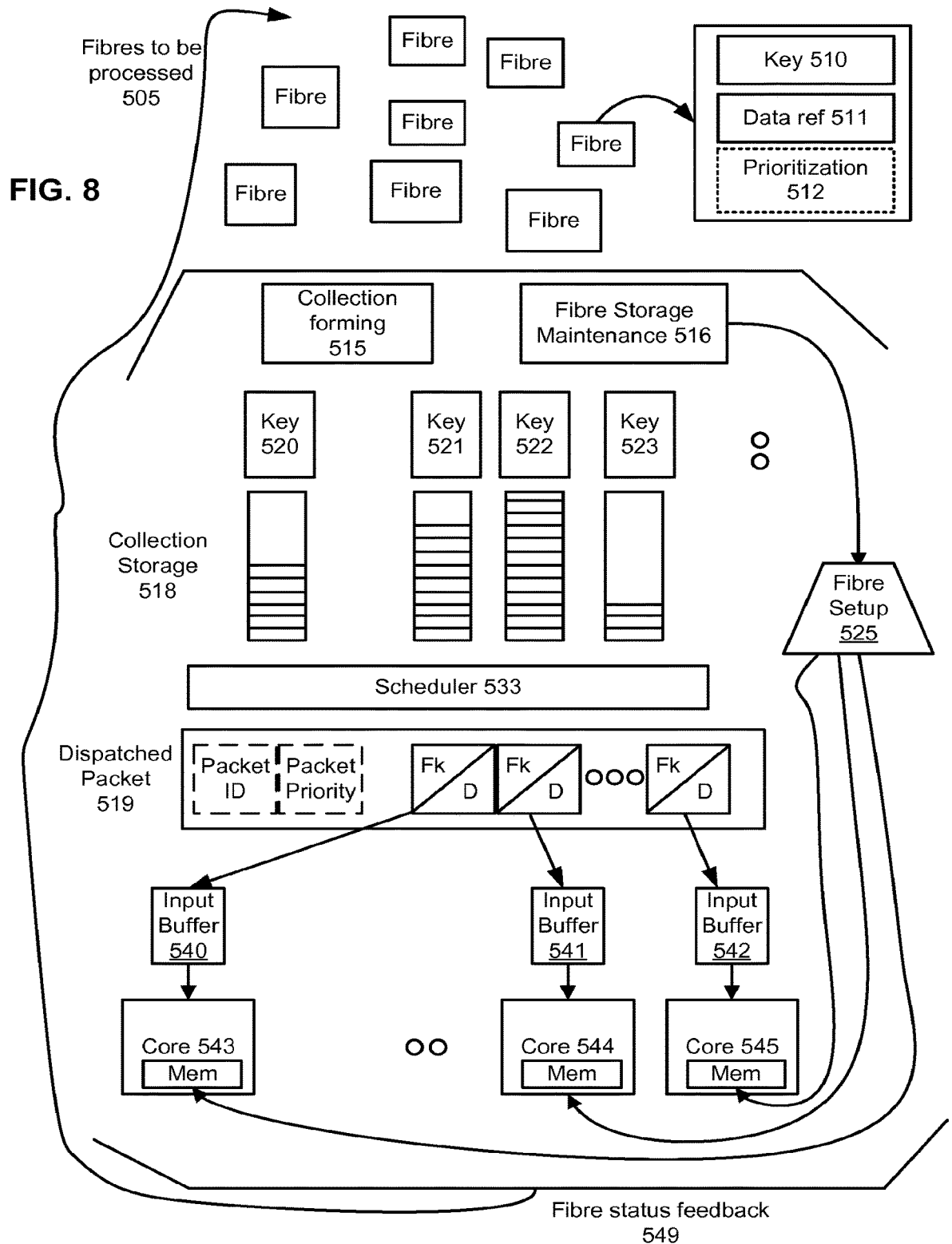
FIG. 8 depicts dynamic collection, scheduling, and distributed execution of fibre routines on a plurality of computation units.

FIG. 8 depicts a dynamic example of collection, scheduling, and distributed execution of fibre routines on a plurality of computation cores 543-545. More particularly the depicted example shows that a number of fibres to be processed 505 can be instantiated. Such instantiation as described can occur by virtue of threads instantiating fibres or by fibres instantiating descendent fibres. In some exemplary implementations, threads can instantiate new fibres storage but fibres can only create descendent fibres that reference already instantiated fibre storage within the scope of the instantiating fibre. FIG. 8 depicts that each fibre definition comprises a scheduling key 510, a data reference 511, and further may comprise prioritization information 512. Data reference 511 is intended to be a reference to fibre storage. Scheduling key 510 can be inferred or it can be explicit.

FIG. 8 further depicts two function modules, one being a collection forming module 515 and another being a fibre storage maintenance module 516. Each function can be performed as part of a scheduler module or can be provided by separate hardware and/or software. These modules receive information about fibres to be processed 505. Such information can be generated during execution of threads, fibres, or a combination thereof, in cores 543-545. The information returned can include identifying information for the fibre, such as an identifier string (e.g., a number), information about a scheduling key, and information about a program to be run when executing the fibre (e.g., a program counter). However, not all this information need be returned or transmitted to collection forming module 515.

For example, in some implementations, all fibres that reference a particular element of fibre storage can be made to execute on the core with the local storage that has access to that element of fibre storage (in an example where there is a disjoint separation of fibre elements among memories). Therefore, in such implementations, when one fibre that references such memory element instantiates another fibre, some portion of information about the newly instantiated fibre can be kept locally. For example, information identifying the program that the fibre will execute can be kept locally; the location of the fibre memory element being referenced also can be kept locally (in contrast, for example, from sending all fibre data to a central collection maintenance function—here collection forming module 515).

Fibre storage maintenance module 516 in conjunction with fibre memory set up 525 operate to provide or allocate fibre memory storage locations in the distributed memories of cores 543-545. As such fibre storage maintenance module 516 can maintain information about current memory usage in cores 543-545. Such memory usage can include thread local storage for threads in addition to fibre memory storage.

Collection storage 518 stores identifications of fibres correlated with their scheduling key, such that groupings of fibres that have a common scheduling key can be selected and output together. Scheduler 533 can select which grouping of fibres is to be outputted, and by particular example a dispatched packet of fibres 519 is shown. Packet 519 also includes a packet identifier and a packet priority indicator. These elements can be created by scheduler 533 upon selection of a group of fibres based on matching their scheduling keys. Subsequently the fibres of a given packet are distributed among input buffers 540-542 each corresponding to a respective core 543-545. The distribution of the fibres is determined based on where a fibre data elements used by a particular fibre is located among the distributed memories of the cores. Such memory can be selected based on a fibre ID or based on an explicit memory reference, for example.

Each core as it is executing workloads, which can include threads and fibre routines, can output fibre status information 549. Such status information can include, for example, new fibres instantiated by other fibres or threads, as well as information about which fibres have been completed. Information about completing fibres can be used to decrement reference counts of fibres that require access to the same element of fibre storage; likewise, instantiation of new fibres that reference a given element of fibre storage result in increases of such reference counts. These reference counts can be maintained by a given core where a group of related fibres executes or by a centralized resource, as shown in FIG. 2 for example.

In one example implementation, collection forming 515 is implemented using a hardware based hash, in which each fibre can be slotted into a collection according to a hash of a respective fibre identifier. The collection forming function 515 groups fibres according to scheduling keys. FIG. 8 depicts scheduling keys 520-523 respectively associated with collections having varying numbers of fibres, each comprised within collections storage 518.

In sum, FIG. 8 depicts how streams of fibres can be instantiated and processed concurrently in a distributed computation resource but without rigid criteria concerning synchronization of accesses to memory or synchronization of program execution among different cores of the computation resource. Rather FIG. 8 depicts that collections of work to be performed, e.g. fibres, are made with one objective being amortization of access to a larger slower memory resource and persistency of storage of data that will be persistently used or updated during a given sequence of computational elements.

Figure 9:
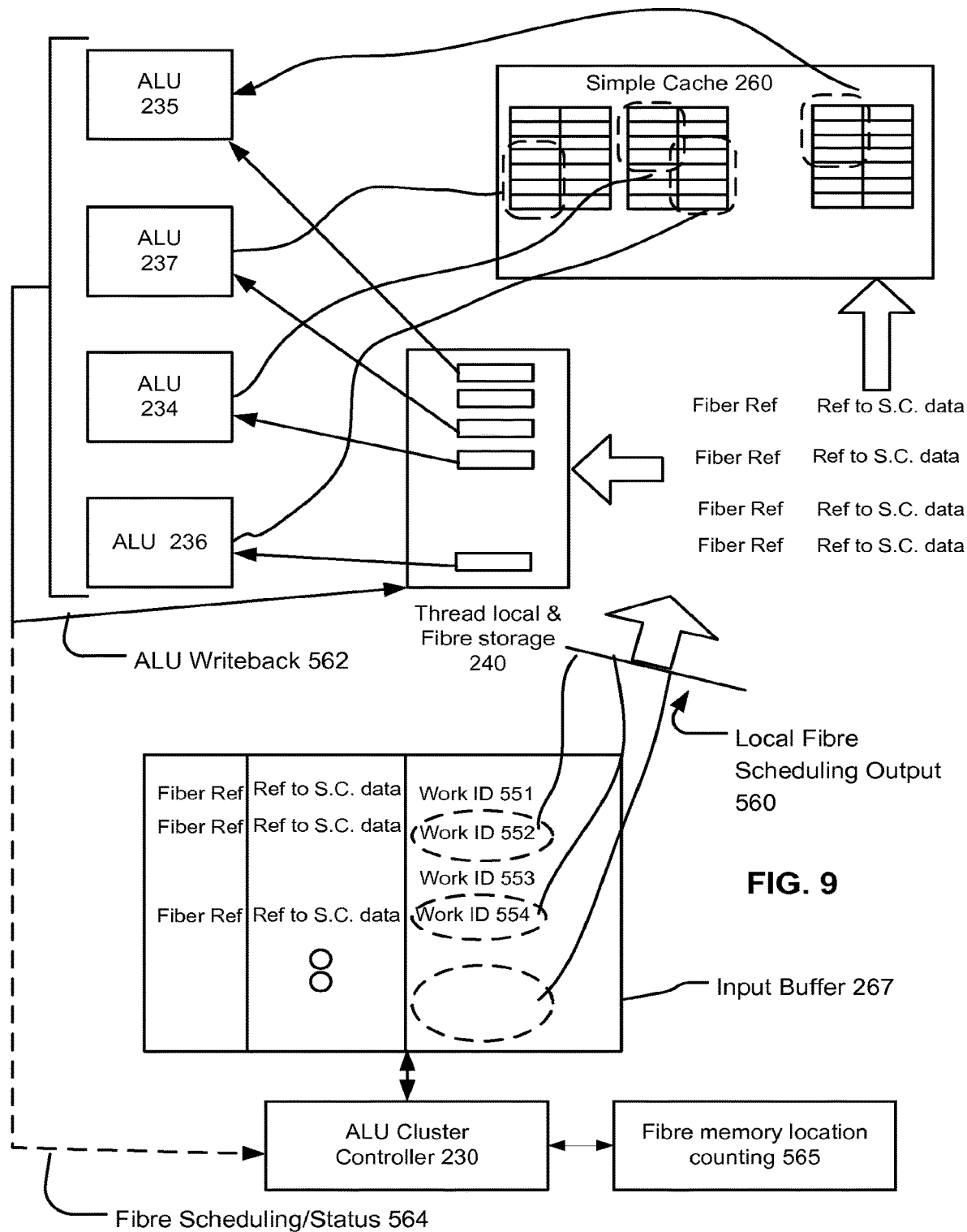
FIG. 9 depicts aspects of example operation of a cluster comprising a plurality of ALUs.

FIG. 9 is used to explain an example operation of a cluster comprising a plurality of ALUs 234-237 operating according to this disclosure. An ALU cluster controller 230 reads from an input buffer 267 to identify a plurality of portions of work to be performed. In this example the portions of work can be identified by work IDs, which in one implementation are program counters or other references to instructions that are to be executed. In one example, implementation these work IDs can be current program counters that indicate the next instruction to be executed for each fibre in input buffer 267. Of course, not all fibres in input buffer 267 may have been taken up for execution within the cluster at any given time, and in such case these work IDs may simply be an identifier of a first instruction for the fibre routine to be executed for those respective fibres. Thus in this example, status information for fibres awaiting execution and for fibres partially executed can be maintained. One reason why such program counters can be maintained in such input buffer is that all the ALUs of the cluster, in some implementations, may all be driven from the same program counter, such that only fibres that are to execute the same next instruction may be collected by ALU cluster controller 230 for execution.

Such status information is more relevant for implementations where ALU cluster scheduler can interrupt fibre routines during execution, such as on an instruction by instruction basis. However in other implementations, a group of fibre routines from input buffer 267 that have not yet begun execution can be scheduled and can be entirely executed without interruption and execution of a different program stream. In either case, threads can be treated differently, in that ALU cluster controller can interrupt execution of threads, such as for the purpose of executing selected fibre routines from input buffer 267. For example, threads that are executing can be interrupted to perform a fibre routine.

FIG. 9 further depicts that work IDs selected from input buffer 267 can be grouped into a local fibre scheduling output 560. In this example for fibres each with a matching work ID can be comprised in output 560. Each fibre reference can be used to retrieve a particular element of fibre storage data from thread local and fibre storage 240 and provide that respective element of fibre storage data to different of the ALUs 234-237. Similarly each fibre comprised in scheduling output 560 can reference one or more data elements stored in simple cache 260.

In one example, each fibre can reference different data elements in simple cache 260 and in other implementations multiple of the fibres scheduled for execution on ALU 234-237 can reference the same element of data from simple cache 260. Thus each ALU 234-237 executes the same thread of control, but can operate on different elements of fibre data in different elements of data from simple cache 260. Each ALU further can output information to be stored in thread local and fibre storage 240. These writes are to respective elements of fibre storage and because no two fibres that reference the same element of fibre storage are scheduled for parallel execution by ALUs 235-237, protection mechanisms for thread local and fibre storage 240 for such fibre storage locations is unnecessary in such implementation. Information concerning fibre scheduling and status 564 also can be provided from ALUs 234-237 to ALU cluster controller 230. In turn, ALU cluster controller 230 can update fibre memory location counts 565 to account for new fibres created by fibre routines that have executed and also to account for fibres that now have completed. It is noted however that, in many implementations, ALU cluster controller does not control population of its input buffer 267 with new fibres that have been created. Rather, input buffer 267 is populated by a central controller which also populates one or more other input buffers for other ALU clusters (not depicted here).

Figure 10:
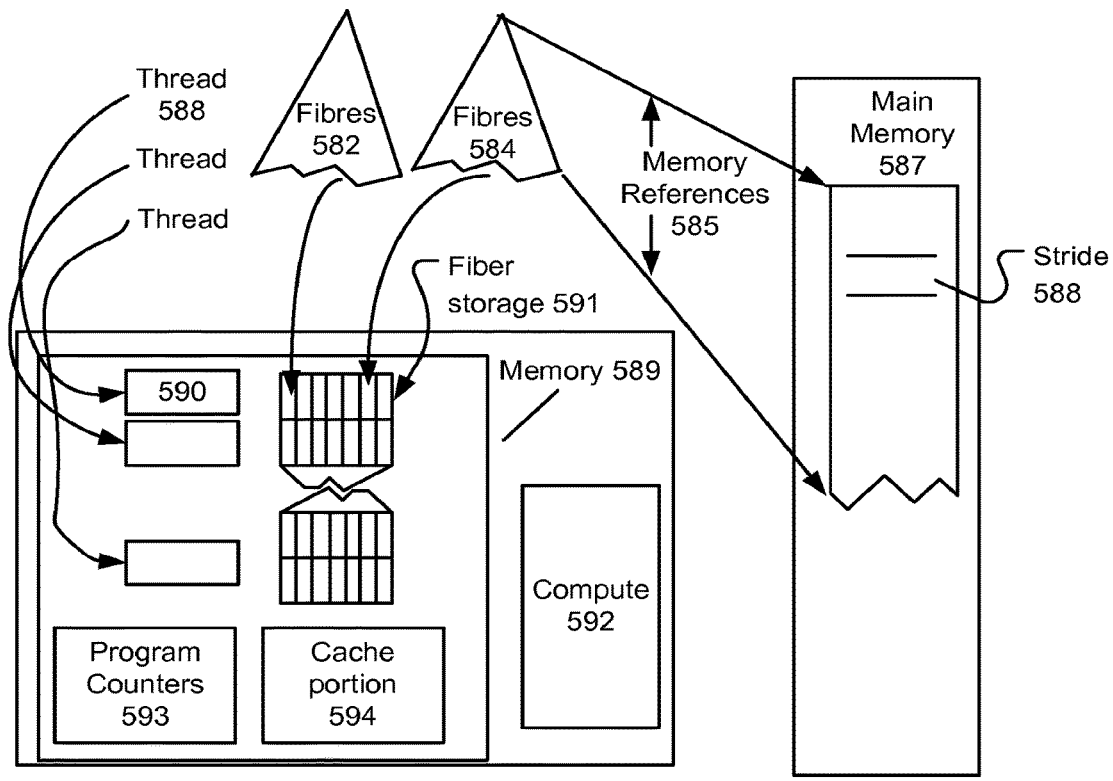
FIG. 10 depicts a local memory of a computation cluster stores thread local variables and multiple elements of fibre data storage.

FIG. 10 depicts a situation where local memory of a computation cluster stores thread local variables and multiple elements of fibre data storage, for example thread 588 uses that local storage portion 590 in memory 589. This portion is expected to be allocated during a thread setup process as a maximum amount of memory that the thread 588 is able to use. FIG. 10 depicts two different families of fibres 582 and 584, both of which reference different locations in fibre storage 591, while members of each family reference the same element of fibre storage. FIG. 10 further depicts that memory references made by members of a given family of fibres, e.g. fibres 584, will vary during the course of recursive instantiation of these related fibres. In this example these memory references 585 are made to a main memory 587. Further this example shows that these memory references can be on a regular stride or interval 588. In some implementations these memory references can be used as scheduling keys to collect fibres of different families, for example fibres from fibres 582 and fibres 584 can be collected together based on matching of these memory references. FIG. 10 further depicts computation resources 592 that can be configured to execute fibres and friends, as explained above, and based on program counters that track streams of control for threads and fibres that are concurrently executing in compute 592.

As would be understood from the foregoing, memory 589 can be allocated to multiple different management schemes. One portion of memory 589 can be managed as a cache, in which cache management policies such as least recently used can control what data is stored in the memory. Also, such cache portion of memory 589 would have an intention of being coherent with other memory components in a memory hierarchy (e.g., main memory 587). Such cache portion can be arranged as an interleaved memory or other appropriate organizational approach within that cache portion. FIG. 10 depicts such a memory portion as cache portion 594. An amount of memory 589 allocated to cache portion 594 can be changed or varied. In some implementations, the change can occur dynamically; in other cases, the change can be made during a setup phase of a computation; such as between two distinct parts of a computation workload. For example, in the graphics processing workload, reallocations can be made between rendering of frames. Other conditions that can trigger reallocation are threads (e.g., thread 588) completing, freeing additional memory.

In addition to cache portion 594, memory 589 also includes a managed portion, of which fibre storage 591 is an example. The managed portion has characteristics that differ from the characteristics of cache portion 594. The managed portion does not have an expectation or intention of being coherent with other memories in a memory hierarchy (e.g., memory 587). Note that eventually data in the managed portion may be written out to memory 587, or otherwise available for access by non-local computation. However, that writing or accessibility occurs after a sequence of local computation that may include many reads and writes to the memory, for which no memory coherency operations are generated.

Fibres can be scheduled to begin execution based on determining existence of a memory conflict with another executing or scheduled fibre, or instructions from fibres can similarly be dispatched or held for dispatch based on such memory conflict checks. In thread-oriented computing, instructions from a thread are dispatched for execution and memory correctness is maintained by locking memory locations when an instruction initiates a memory transaction that would present a hazard to a different instruction. The different instruction can begin execution, but the thread of which that instruction is a part will halt waiting on the hazard to clear.

Figure 11:
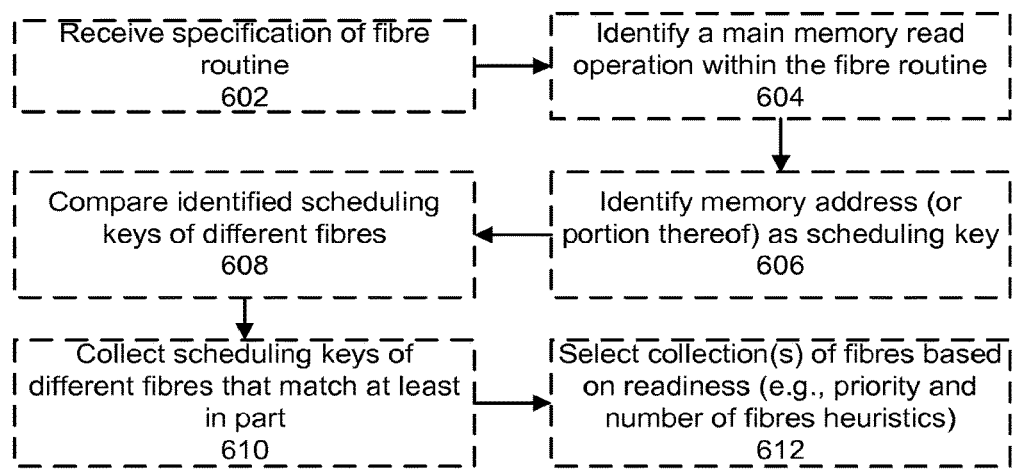
FIG. 11 depicts portions of a process that can be performed by a centralized controller provided in implementations of these disclosures.

FIG. 11 depicts portions of a process that can be performed by a centralized controller provided in implementations of these disclosures. The depicted process includes receiving (602) a specification of a fibre routine. Based on the specification, main memory read operation can be identified (604). From the main memory read operation a memory address or a portion thereof can be identified (606); this identified memory address or a portion of it can be used as a scheduling key. One use of such scheduling key is to compare/match (608) scheduling keys or portions of thereof in order to collect (610) fibres together. Groups of fibres are selected (612) for scheduling based on criteria such as priority, collection fullness, and heuristics.

Figure 12:
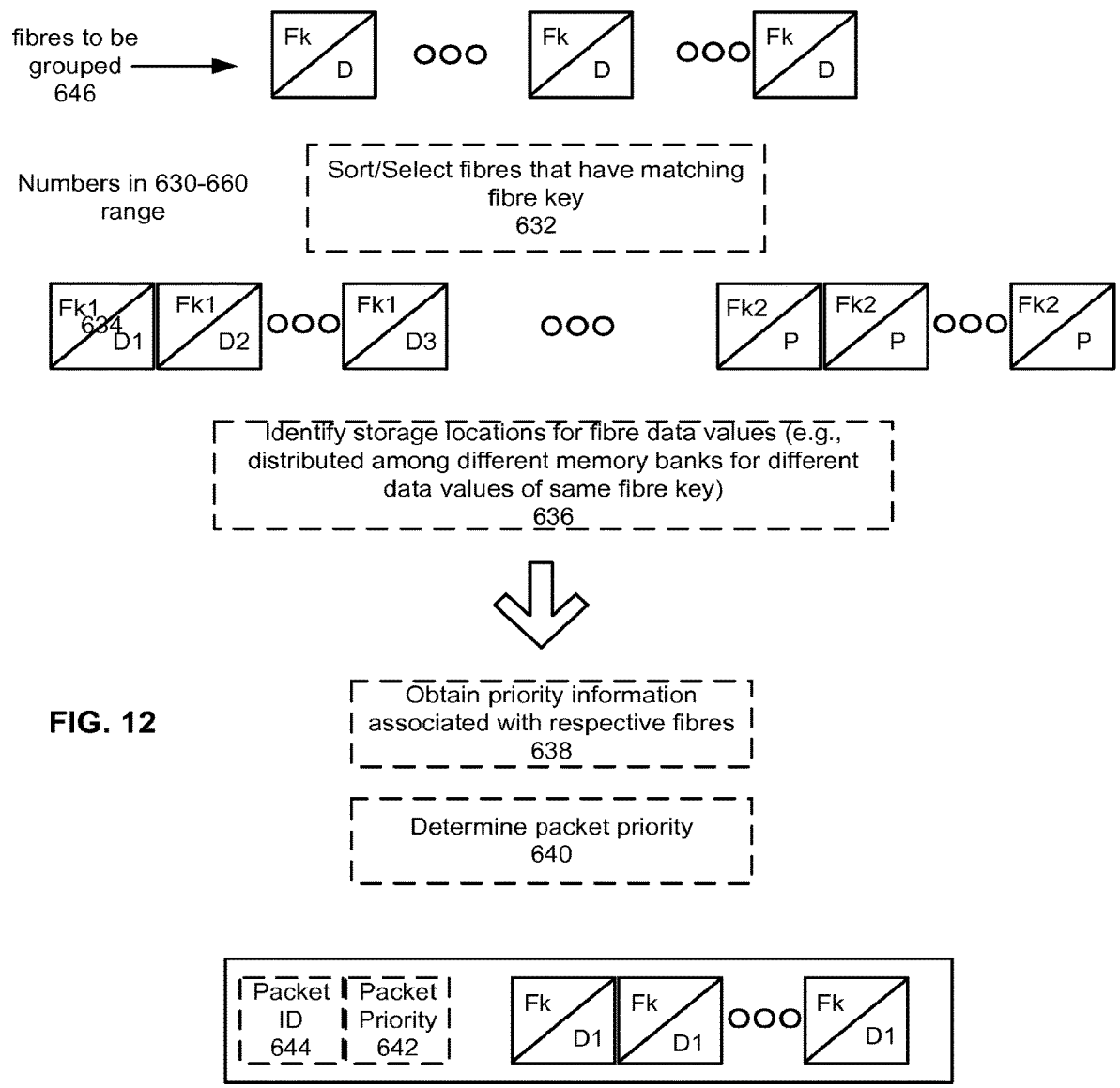
FIG. 12 depicts aspects of a prioritization process that can be used in systems according to the disclosure.

As explained above, fibres can be instantiated individually either by a thread or another fibre. However, fibres are dispatched for execution in groups. If a prioritization scheme is desired to be implemented for such groupings of fibres, then one approach to such prioritization is exemplified in FIG. 12. FIG. 12 depicts that a number of fibres to be grouped 646 are available these fibres can be collected or sorted (632) according to their fibre keys (also called scheduling keys herein). Each fibre also can be associated with an individual priority, which can be obtained (638). Upon determining groupings of such fibres, a priority 642 for each determining grouping also can be determined (640). A packet identifier 644 also can be determined (642).

A variety of approaches can be provided to determining a priority for a grouping of fibres based on priorities of individual fibres comprised within that grouping. In one example average of the individual fibre priorities can be used to establish a group priority. In another example of weighted average can be used where a fibre with especially high priority can have a much higher effect on the overall priority of the group then a simple average would have provided. In other implementations, priorities assigned to groupings of fibres can be influenced by the current state of threads executing within the system as well.

In furtherance of such example variations, FIG. 12 also depicts expected storage locations for fibre data used by the fibres of a packet can be used in determining priority of the packet. For example if multiple memories storing fibre data for fibres in a given packet are nearing capacity, then a priority of such packets can be increased. Notably since fibre storage already has been allocated for fibres (except for newly instantiated families of fibres), more local storage is not necessarily required in order to increase the number of fibres that are within the same family.

Figure 13:
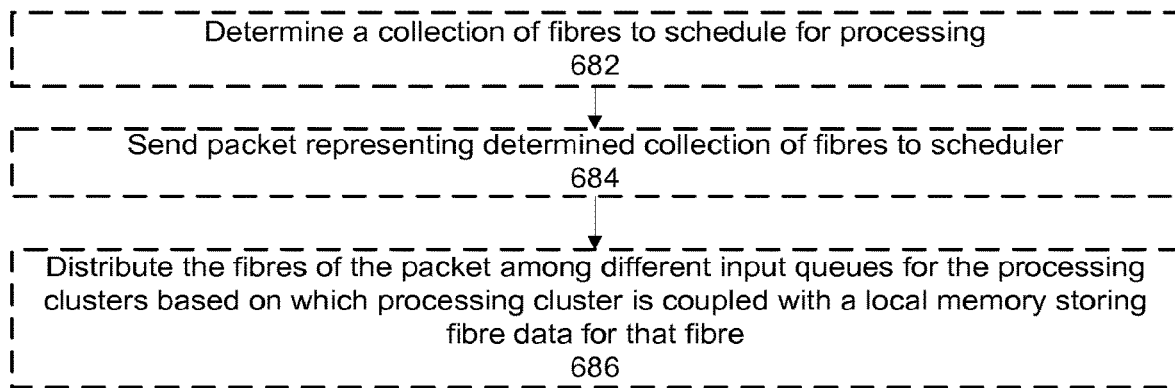
FIG. 13 depicts aspects of an example process according to the disclosure.

FIG. 13 depicts a process in summary of some disclosures foregoing. The depicted process includes determining (682) a collection of fibres to schedule for processing, sending (684) a packet representing the determined collection of fibres. Such packet of fibres is distributed (686) among different input queues for processing clusters which will execute the computation based on the contents of their respective input queues, and threads that have been scheduled or signed for execution therein.

Figure 14:
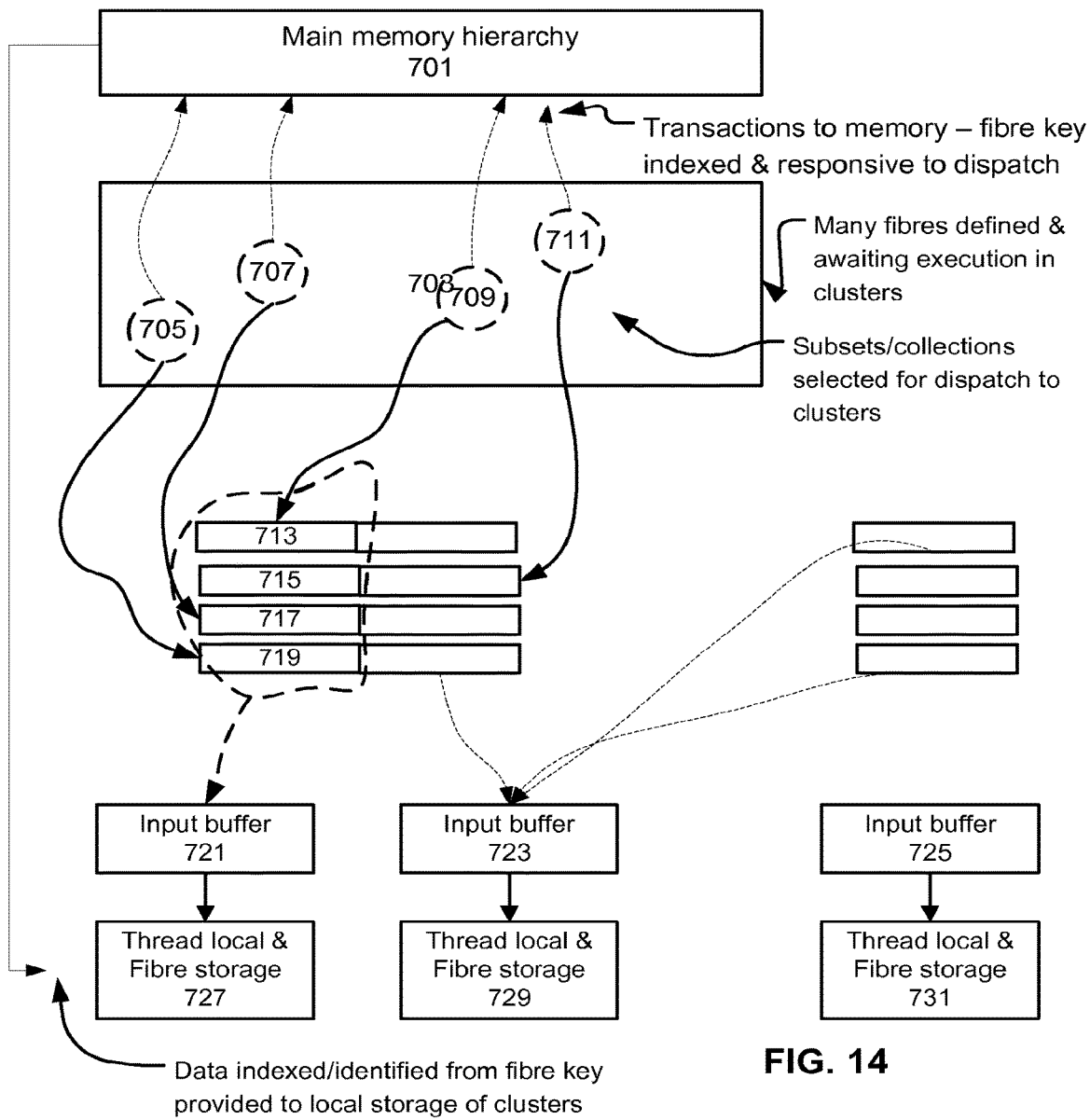
FIG. 14 depicts a collection memory in which fibres can be grouped per aspects of the disclosure.

FIG. 14 further explain certain aspects of such fibre computing within example wherein a collection memory 703 stores information for a variety of fibres organized according in which collection the fibre is a member. It is generally expected that a fibre exists in only one collection; however, it would be expected that fibres referencing the same element of fibre data can exist in a large number of collections within collection memory 703. In furtherance of the example collections 705, 707, 709 and 711 are selected for dispatch. Responsive to such selection transactions to a main memory hierarchy 701 are initiated, the results of which are provided to thread local and fibre storage 727, 729, and 731. The selected collections however are dispatched and distributed among input buffer 721, 723, and 725. Such distribution can, in an example, be based on a portion of an identifier for each fibre, which can in turn be related to a memory address range of thread local and fibre storage. The example depicted also shows that for any given packet of fibres, the fibres are generally expected to be distributed among the different computational clusters, and not concentrated into only a subset thereof, on average.

Figure 15:
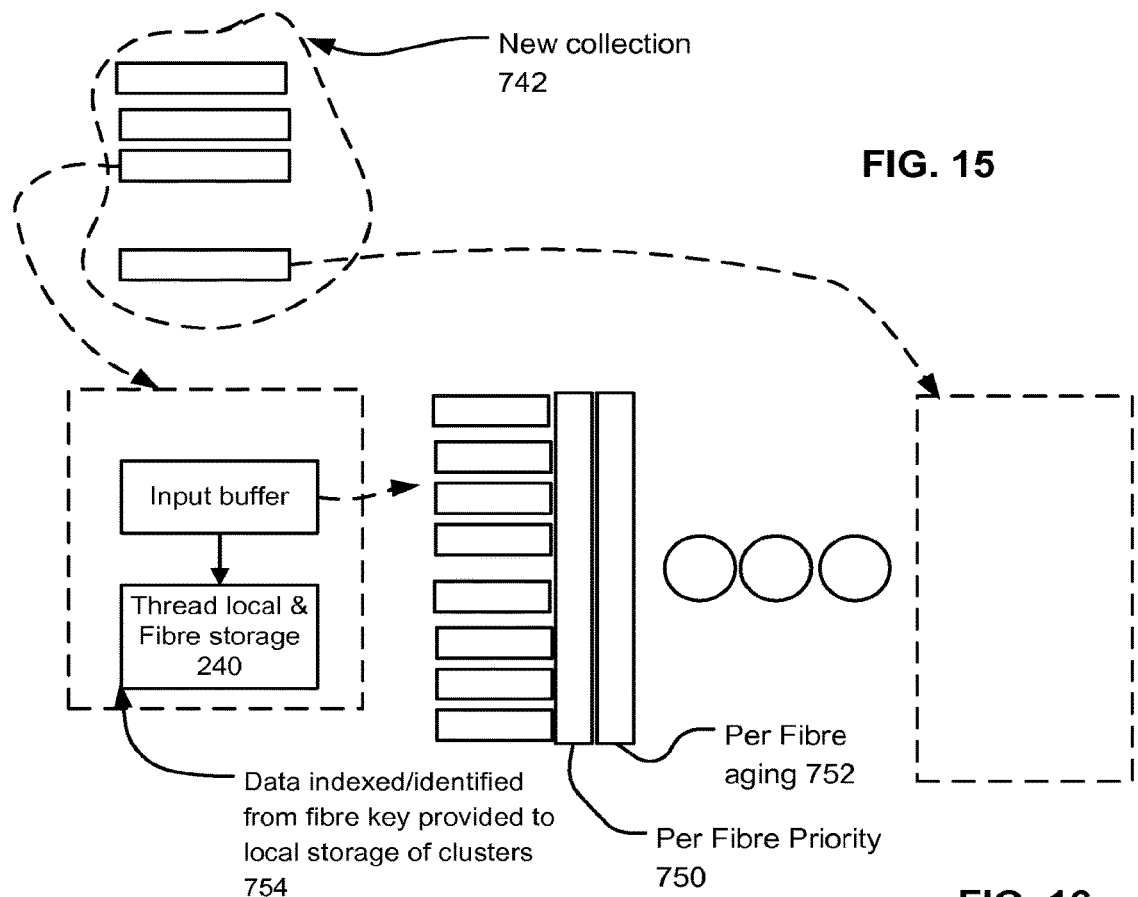
FIG. 15 example implementation aspects of an input buffer receiving dispersed fibres.

FIG. 15 depicts an example of implementation of the input buffer shown in the above examples. FIG. 15 depicts a new collection 742 to be distributed among input buffers of a plurality of computation clusters. Each input buffer can maintain a per fibre priority 750. Initially such per fibre priority can be based on a packet priority, but can be updated by the local cluster controller. Additionally an aging mechanism for fibres can be provided, where such aging can be input into fibre priority selection. FIG. 15 also can be understood in the context that implementations of fibre computing allow a centralized selection of which computation portions will be selected for execution within a general window of computation time and a main memory access that will be needed by those computation portions can be accomplished and amortized with the results of such main memory access stored in distributed fashion among the computation clusters that will execute the computation portions. However within each computation cluster, a wide latitude of what instructions execute and in what order can be provided, where such local scheduling is handled by a local controller to account for conditions specific to the controller and to avoid overhead incurred by coordination among the computation clusters.

Figure 16:
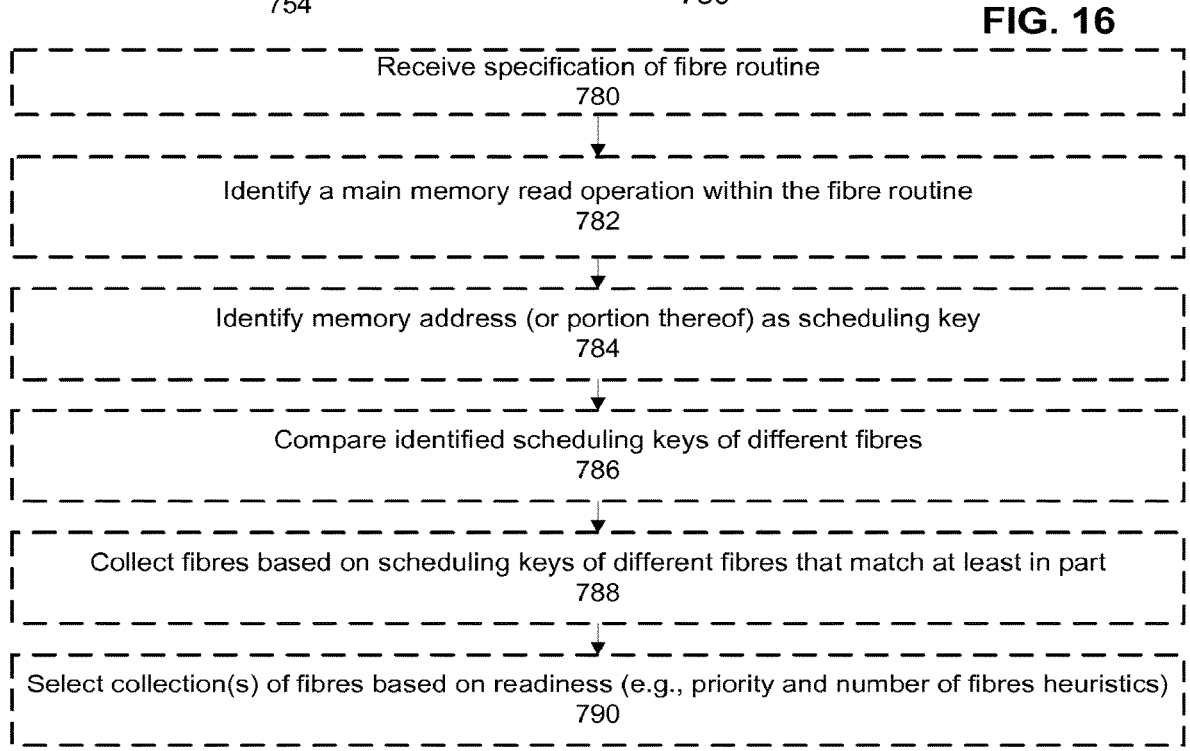
FIG. 16 depicts aspects of an example process according to the disclosure.

FIG. 16 depicts aspects of an example process in accordance with these disclosures. At 780, a specification of a fibre routine is received, and at 782, a main memory read operation within the fibre routine is identified. At 784, a memory address (or part of) is identified as a scheduling key. Process portions 780, 782 and 784 can be performed a number of times for different fibres. At 786, scheduling keys of different fibres are compared. At 788, fibres are collected according to their scheduling keys. At 790, collection(s) of fibres are selected for execution according to criteria, such as readiness. Readiness criteria can include aspects such as priority and numerosity heuristics.

It is expected that fibres effect or outputs by writing back to local fibre storage, and do not arbitrate for shared memory resources. Further, in many implementations fibre routines are coded to avoid calling another routine that returns a value and which would cause the fibre routine to stall for an indefinite period waiting for such value to return. Thus for grammatical components and instantiate or otherwise call fibres, in these implementations, also do not need to stall or wait for the fibre to return any value to the calling thread or other fibre. As such, the time to complete execution of any particular fibre is not as critical because other computational flows do not need to be stalled awaiting completion of that fibre.

Scheduling keys were described in many foregoing example implementations. In some implementations, and in some cases, depending on a nature of a workload being performed, scheduling keys can be compressed, or otherwise referenced by shorthand notation. An example workload of ray tracing will be used as an example. In such example, a parent ray tracing thread may output a different fibre for each ray that it wants traced in a scene. Thus, some threads may output a few fibres, some may output tens or hundreds of millions, or billions of fibres. In some cases, each fibre may initially start with the same scheduling key. In an example, such scheduling key can reference a starting storage address of a first element of an acceleration structure that subdivides the 3-D scene. Elements of the structure can be stored in memory at regular intervals (e.g., each element can be stored in a quadword). As such, a certain kind of fibre routine can be setup to have a default scheduling key; for example, an acceleration structure traversal fibre routine can have the head element of the acceleration structure as a default. Thus, a thread instantiating such fibres does not need to explicitly identify that location.

Examples of acceleration structures include bounding volume hierarchies, such as sphere and rectangle hierarchies and kD-trees, without limitation. For example, in a uniform sphere hierarchy, the elements of such structure are spheres. If the acceleration structure is homogeneous, then leaf nodes in the structure bound primitives; a heterogeneous structure can have elements that bound other acceleration structure elements and primitives.

A variety of structures, devices, components and other constituent elements were depicted and described above, along with interrelationships allowing the flow of data and other information between and among them, and functions and purposes for them were described. These are means for performing the functions and purposes attributed to them in the disclosure.

Code for any method can be stored in non-transitory computer readable media, such as solid-state drives, hard drives, CD-ROMs and other optical storage means, and transiently in nonvolatile memories. A computer readable medium also can include communication signals. When such code is embodied in a communication signal and that signal is read and processed by a computer, the computer uses that signal and its physical medium as a computer readable medium.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Some aspects of the API described herein can be implemented as procedures, functions, or calls to such procedures and functions. This description implies no limitation as to a programming methodology that can be used to implement or provide the functionality described as being available through these procedures or functions, so long as software, hardware or a mixture thereof provides a programmer with an ability to access such functionality through an interface provided therefore. These names imply no requirement as to what code performing these functions need to called in an implementation.

In some examples, the computation resources used to execute threads and fibres can be largely undifferentiated. Rather, many of the fibre computing characteristics described herein can be implemented by a central controller that groups fibres for dispatch and dispersion among the computation resources input queues serving these computation resources, and the coordination and counting of which fibres still exist that require a given element of fibre storage.

As would be discerned from these disclosures, one example situation in which fibre computing can be used is a situation where a large number of data elements of a first type, which are not all known a priori, need to be processed or used in conjunction with a large and predetermined data set. In some example situations, the processing of some first type data elements with one portion of the predetermined data set affects how those first type data element are processed with other portions of the predetermined data set. The predetermined data set can vary as well, such as being updated relatively infrequently. In an example graphics application, the predetermined data set may be updated a few hundred times a second and could include many millions of items, which can be accessed millions or billions a second. In general, a centralized scheduler for fibre computing can schedule collections of fibres based on expected maximization of computing throughput rather than explicitly serving the prioritization of any particular fibre.

The various examples described above are provided by way of illustration only and should not be construed as limiting. For example, only a limited example of ray tracing behavior was presented, and it would be understood that practical implementations involve many more rays, and often more concurrent processing thereof. The disclosures herein can be adapted and understood from that perspective. In addition, separate boxes or illustrated separation of functional elements of illustrated systems implies no required physical separation of such functions, as communications between such elements can occur by way of messaging, function calls, shared memory space, and so on, without any such physical separation. More generally, a person of ordinary skill would be able to adapt the disclosures relating to the programming semantic to a variety of other ray tracing/ray shading implementations, and no implied limitation as to its application exists from the systems, methods, and other disclosure used to explain examples thereof

APPENDIX

```
/* Definitions
       /* Input Ray
       TypeDef struct _GPUInputRay {
       Float4 a, b;
       } GPUInputRay;
/* An output result
       TypeDef struct _GPUResult {
       Int4 a;
       Floats alpha, beta, float t;
       Int flags;
       } GPUResult;
/* Internal ray; for GPU traversal
       TypeDef struct _GPUInternalRay {
       Floats3 origin, direction;
       Unsigned int flags, tid;
       Floats alpha, float beta;
       Float t;
       } GPUInternalRay;
Inline Bool SphereTest(_fibrestorage GPUInternalRay     *ray),
       _read._only _global float4     *sphere_geometry)
       {
       Bool hit;
       /* Perform an intersection test between between ray and *sphere_geometry
       if (hit) return true else return false;
       }
Inline void TrianglePairTest(_fibrestorage GPUInternalRay     *ray
       _read_only _global float4    *scenedata
       unsigned int     address_qw
       {
       Bool hit;
       Float alpha, beta;
       Test triangle(s) at scenedata for intersection
       If (hit) {assign elements of ray output to t, tid, alpha, beta}
       }
/* Define a fibre routine to test primitives (e.g, triangles) for intersection
_fibre void ProcesriangleChildlist(_fibrestorage GPUInternalRay     *ray,
_read_only     _global float4     *scene_data, _fibrekey unsigned int sid)
       {
       unsigned int address_qw;
       compute memory location for scene data → store in address_qw
       TriangleTest(ray, scene_data, address_qw);
       }
/* Define a fibre routine to test geometry acceleration elements (e.g. spheres) for intersection
_fibre void ProcessSphereChildlist(_fibrestorage _GPUInternalRay *ray;
                           Read_only _global float4 *scend_data
                           _fibrekey unsigned int SID; GPUInternalRay
*ray)
       {
       float4 sphere_geo;
       uint4 sphere_info;
       unsigned int address_qw;
       }
/* Walk sphere childlist, testing spheres against this ray until completed
       do {
       Compute address for sphere data;
       Load sphere data from global memory
       /* Perform sphere test & fork fibre responsive to a hit
       if (SphereTest(ray, &sphere_geo){
       if(SPHERE_HAS_TRIANGLE_CHILDREN(sphere_info) {
              +ProcessTriangleChildList(ray, scene_data, GetChildSID(sphere_info);
       else {
              +ProcessSphereChildList(ray, scene_data, GetChildSID(sphere_info);
       }
       } Repeat until sphere list is exhausted
/* Top level thread to control traversal, can declare variables to be assigned fibre storage and
invoke fibres that can access such variables
_Kernel void Traverse (_readonly _global float4 *scene_data
                     _readonly _global GPUinputray *inputray_data
                     _writeonly _global GPUresult *result_data)
       {
       /* Declare element of fibre storage, shared among child fibres
       _fibrestorage GPUInternalRay ray;
```

APPENDIX-continued

```
{
Initialize
/* traverse
    if (ray.t > 0.0f) +ProcessShereChildllist(&ray, scene_data, 0) /* Invoke fibre;
    ray data in fibre storage
            else write out results to result_data[gid] /* alpha, beta, t, flags, etc.
    }
}
```

What is claimed is:

1. A processing system comprising:
a plurality of computation elements, each of the computation elements comprising a local memory and a plurality of Single Instruction Multiple Data (SIMD) Arithmetic Logic Units (ALUs), wherein the computation elements are operable to execute computer executable instructions to instantiate one or more fibres;
an allocator operable to assign a storage allocation associated with a fibre of the one or more fibres;
a ready unit configured to hold the one or more fibres for later execution; and
a scheduler operable to schedule work for the computation elements from among the one or more fibres held in the ready unit and other workloads,
wherein the processing system is configured such that execution of computer executable instructions associated with a parent fibre of the one or more fibres by a computation element instantiates one or more descendent fibres, the parent fibre having a storage allocation assigned thereto, and the instantiated one or more descendent fibres inheriting access to said storage allocation of the parent fibre, and wherein the scheduler is configured to prevent two or more descendent fibres which are descended from the same parent fibre being scheduled to be executed in parallel.

2. The processing system of claim 1 wherein the allocator is operable to assign a region of a local memory of one of the computation elements to a fibre as the storage allocation.

3. The processing system of claim 1 wherein the scheduler is configured to schedule fibres for the computation elements based on the storage allocations assigned by the allocator.

4. The processing system of claim 1 wherein the local memory of each of the computation elements is a cache and the storage allocations reside within a cache.

5. The processing system of claim 4 wherein cache management behavior for the caches is different between storage allocations and other cache entries.

6. The processing system of claim 1 wherein the storage allocations are managed with a reference counting algorithm.

7. The processing system of claim 1 wherein the scheduler is configured to select among available workloads based on resource availability and the resource requirements of the workloads.

8. The processing system of claim 1 further comprising specialized logic for rasterizing primitives.

9. The processing system of claim 1 further comprising specialized logic for testing a ray against a shape in three-dimensions for use in ray tracing.

10. A method of processing data using a plurality of computation elements, each of the computation elements comprising a local memory and a plurality of Single Instruction Multiple Data (SIMD) Arithmetic Logic Units (ALUs), the method comprising:
instantiating one or more fibres;
assigning a storage allocation to a fibre of the one or more fibres;
storing the one or more fibres which are ready for execution; and
scheduling work to be executed on the computation elements from among the stored one or more fibres and other workloads;
wherein execution of computer executable instructions associated with a parent fibre of the one or more fibres by a computation element instantiates one or more descendent fibres, the parent fibre having a storage allocation assigned thereto, and the instantiated one or more descendent fibres inheriting access to said storage allocation of the parent fibre, and wherein said scheduling prevents two or more descendent fibres which are descended from the same parent fibre being executed in parallel on the computation elements.

11. The method of claim 10 wherein said assigning a storage allocation to a fibre comprises assigning a region of a local memory of one of the computation elements to the fibre as the storage allocation.

12. The method of claim 10 wherein said scheduling work to be executed on the computation elements comprises scheduling fibres to be executed on the computation elements based on the storage allocations assigned to the fibres.

13. The method of claim 10 wherein the local memory of each of the computation elements is a cache and the storage allocations reside within a cache.

14. The method of claim 10 wherein said scheduling work to be executed on the computation elements comprises selecting among available workloads based on resource availability and the resource requirements of the workloads.

15. The method of claim 10 further comprising rasterizing primitives for rendering an image.

16. The method of claim 10 further comprising testing a ray against a shape in three-dimensions for use in ray tracing.

17. Graphics processing apparatus comprising:
a plurality of computation elements, each of the computation elements comprising a local memory, and a plurality of Single Instruction Multiple Data (SIMD) Arithmetic Logic Units (ALUs), wherein the computation elements are operable to execute computer executable instructions to instantiate one or more fibres;
allocation logic configured to assign a region of a local memory of one of the computation elements to a fibre of the one or more fibres as a storage allocation;
a ready store configured to store the one or more fibres for subsequent execution, wherein the ready store is distinct from the computation elements; and
scheduling logic configured to schedule, based on the storage allocations assigned by the allocation logic, work to be executed on the computation elements from among the one or more fibres stored in the ready store and other workloads, wherein the scheduling logic is distinct from the computation elements and distinct from the ready store;

wherein the graphics processing apparatus is configured such that execution of computer executable instructions associated with a parent fibre by a computation element instantiates one or more descendent fibres, the parent fibre having a storage allocation assigned thereto, and the instantiated one or more descendent fibres automatically inheriting access to said storage allocation of the parent fibre, and wherein the scheduling logic is configured to prevent two or more descendent fibres which are descended from the same parent fibre being scheduled to execute in parallel.

18. The processing system of claim 1, wherein only fibres that descend from a common parent fibre access a storage allocation for these fibres.

19. The processing system of claim 1, wherein fibres that do not descend from a common parent fibre access different storage allocations.

20. The processing system of claim 1, wherein the scheduler is configured to prevent two or more fibres that reference a same element of fibre storage being scheduled to be executed in parallel.

* * * * *